(12) United States Patent
Zheng et al.

(10) Patent No.: US 9,953,592 B2
(45) Date of Patent: Apr. 24, 2018

(54) DISPLAY COMPONENT AND ELECTRONIC DEVICE

(71) Applicant: Lenovo (Beijing) Co., Ltd., Beijing (CN)

(72) Inventors: Xiaopan Zheng, Beijing (CN); Chenggang Zou, Beijing (CN); Ke Shang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 365 days.

(21) Appl. No.: 14/818,494

(22) Filed: Aug. 5, 2015

(65) Prior Publication Data

US 2016/0293112 A1    Oct. 6, 2016

(30) Foreign Application Priority Data

Apr. 2, 2015   (CN) .......................... 2015 1 0155038

(51) Int. Cl.
*G03B 21/14*   (2006.01)
*H04N 9/31*   (2006.01)
*G09G 3/36*   (2006.01)
*G03B 21/20*   (2006.01)

(52) U.S. Cl.
CPC ....... *G09G 3/3611* (2013.01); *G03B 21/2073* (2013.01); *H04N 9/3167* (2013.01); *G09G 2300/0426* (2013.01)

(58) Field of Classification Search
CPC ...... H04N 9/3167; H04N 9/31; H04N 9/3108; H04N 9/3102; G03B 21/2073; G03B 21/008; G03B 21/14
See application file for complete search history.

(56) References Cited

U.S. PATENT DOCUMENTS

| | | | |
|---|---|---|---|
| 9,525,855 B2 * | 12/2016 | Willett | G02B 27/283 |
| 2009/0141244 A1 * | 6/2009 | Miller | G02B 27/104 |
| | | | 353/20 |
| 2010/0033816 A1 * | 2/2010 | DiZio | G02B 5/305 |
| | | | 359/489.11 |

* cited by examiner

*Primary Examiner* — William C Dowling
(74) *Attorney, Agent, or Firm* — Brinks Gilson & Lione; G. Peter Nichols

(57) ABSTRACT

The application provides a display component and an electronic device using the display component. The display component comprises: a light source unit configured to emit source light; a polarization unit configured to at least partially convert the source light into a first polarized light with a first polarization direction; a first reflecting unit configured to at least partially convert the first polarized light into a first reflected light on a first reflective surface; and a display unit configured to receive the first reflected light and adjust the first reflected light to become initial light by adding information of an image to be displayed into the first reflected light.

16 Claims, 28 Drawing Sheets

DISPLAY COMPONENT AND ELECTRONIC DEVICE

This application claims priority to Chinese patent application No. 201510155038.0 filed on Apr. 2, 2015, the entire contents of which are incorporated herein by reference.

The present application relates to the field of display component, and more particularly, to a display component and an electronic device using the display component.

BACKGROUND

In a display component that uses a light source unit to provide backlight, polarized light is required to illuminate so as to execute display. Natural light emitted from the light source unit is non-polarized light, cannot be directly used to illuminate a liquid crystal layer, natural light must be converted into polarized light. It has already been designed that a beam splitting unit (PBS) converts natural light into polarized light, converted S-polarized light is used to illuminate the liquid crystal layer. However, since the emitting surface of the beam splitting unit should cover the entire liquid crystal layer which deteriorates the miniaturization of the display component.

Accordingly, it is desired to provide a display component and an electronic device using the display component, which can facilitate the miniaturization of the display component.

SUMMARY

According to an embodiment of the present application, there is provided a display component, comprising: a light source unit configured to emit source light; a polarization unit configured to at least partially convert the source light into a first polarized light with a first polarization direction; a first reflecting unit configured to at least partially convert the first polarized light into a first reflected light on a first reflective surface; and a display unit configured to receive the first reflected light and adjust the first reflected light to become initial light by adding information of an image to be displayed into the first reflected light.

According to yet another embodiment of the present application, there is provided an electronic device, comprising: a processing component configured to generate a first image to be displayed and execute display control; a display component configured to execute display of the first image and comprising: a light source unit configured to emit source light; a polarization unit configured to at least partially convert the source light into a first polarized light with a first polarization direction; a first reflecting unit configured to at least partially convert the first polarized light into a first reflected light on a first reflective surface; and a display unit configured to receive the first reflected light and adjust the first reflected light to become initial light by adding information of an image to be displayed into the first reflected light.

The display component and the electronic device using the display component according to an embodiment of the present application can facilitate the miniaturization of the display component.

It is to be understood that both the foregoing general descriptions and the following detailed descriptions are exemplary and intended to provide further explanations of the claimed technique.

DETAILED DESCRIPTION

Hereinafter, the embodiments of the present application will be described in detail with reference to the accompanying drawings.

First, a display component according to an embodiment of the present application will be described with reference to FIGS. 1 to 3. The display component according to an embodiment of the present application may be a transmissive display component like LCD, and may also be a reflective display component like LCOS. In addition, the display component according to an embodiment of the present application may directly display an image to be displayed for a user, and may also provide an image source to be displayed in for example a near-vision optical display system that adopts a light guide optical element (LOE), and thereafter other components in the optical system perform light path conversion and/or amplification on the image source provided by the display component according to an embodiment of the present application, so that the user can perceive.

Figure 1:
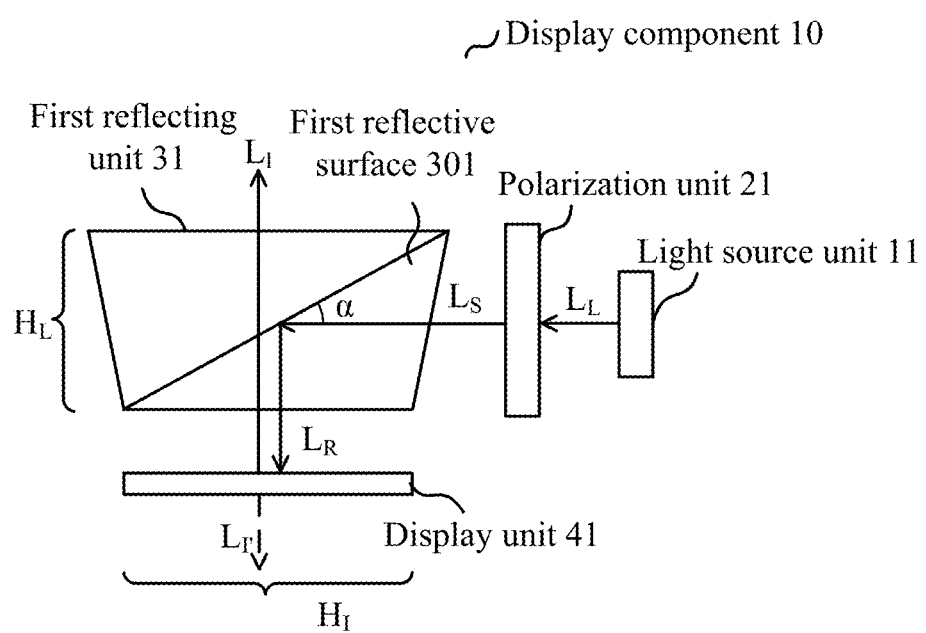
FIG. 1 is a schematic diagram illustrating the display component in a first example according to an embodiment of the present application.

FIG. 1 is a schematic diagram illustrating the display component in a first example according to an embodiment of the present application. As shown in FIG. 1, a display component 10 in the first example according to an embodiment of the present application comprises a light source unit 11, a polarization unit 21, a first reflecting unit 31 and a display unit 41.

Specifically, the light source unit 11 is configured to emit source light $L_L$. The source light $L_L$ is planar natural light. The polarization unit 21 is provided within an irradiation area of the source light $L_L$ and at least partially converts the source light $L_L$ into a first polarized light $L_S$ with a first polarization direction. In an embodiment of the present application, the polarization unit 21 can be configured by a ¼ wave plate which converts the circularly polarized source light $L_L$ into the linearly polarized first polarized light $L_S$, and the first polarized light $L_S$ is a S polarized light with the first polarization direction.

The first reflecting unit 31 is provided within an irradiation area of the first polarized light $L_S$ and at least partially converts the first polarized light $L_S$ into a first reflected light $L_R$ on a first reflective surface 301. In an embodiment of the present application, the first reflecting unit 31 does not change the polarization direction of light reflected by itself, that is, the first reflected light $L_R$ has the first polarization direction.

The display unit 41 is provided within an irradiation area of the first reflected light $L_R$, and is configured to receive the first reflected light and adjust the first reflected light to become initial light by adding information of an image to be displayed into the first reflected light. For example, the display unit 41 is the liquid crystal layer of the LCD display component, it can change an arrangement of internal molecules under control of a display drive voltage (not shown), cause the first reflected light $L_R$ to become initial light corresponding to the image under irradiation of the first reflected light $L_R$ by using the liquid crystal material to correspondingly block the first reflected light $L_R$ or let the first reflected light $L_R$ travel through.

In the display component 10 shown in FIG. 1, the exit direction of the initial light depends on the display principle of the display component 10 is reflective or transmissive. Specifically, in the case where the display component 10 is a reflective display component, the first reflected light $L_R$ is reflected by the display unit 41 as the initial light $L_I$. In the case where the display component 10 is a transmissive display component, the first reflected light $L_R$ transmits through the display unit 41 and become the initial light $L_I$.

As shown in FIG. 1, a thickness $H_L$ of the first reflecting unit 41 in an exit direction of the initial light $L_I$ is less than a width $H_I$ of the display unit 41 in an incident direction of the source light $L_L$. Furthermore, the angle α between the incident plane of the first reflected light $L_R$ on the first reflecting unit 31 and the first reflective surface 301 is less than a first threshold. In an embodiment of the present application, the first threshold is for example 45°, and the first threshold is 40°.

If only one polarization beam splitting unit (PBS) is used to convert natural light into polarized light, this polarization beam splitting unit (PBS) needs two equilateral rectangular prisms cemented, in entirety it forms a structure that is approximately a cube, so that a thickness of the polarization beam splitting unit (PBS) in an exit direction of the initial light is equal to a width of the display unit 41 in an incident direction of the source light. However, when adopting the combined configuration of the polarization unit 21 and the first reflecting unit 31, there is no need to adopt the structure that is approximately a cube, and the shape is flexible and can be designed according to the specific need. In case that it needs to reduce the entire thickness of the display component 10, the relative positions among the light source unit 11, the polarization unit 21 and the first reflecting unit 31 can be set so that the angle α between the incident plane of the first reflected light $L_R$ on the first reflecting unit 31 and the first reflective surface 301 is less than 45° in case that a PBS with an approximate cube is used. Thus, it is implemented that a thickness of the first reflecting unit 31 in an exit direction of the initial light is less than a width of the display unit 41 in an incident direction of the source light which reduces the entire thickness of the first reflecting unit 31 in an exit direction of the initial light and facilitates the miniaturization need of the display component 10.

Furthermore, the first reflecting unit 31 can completely convert the first polarized light $L_S$ into the first reflected light $L_R$ on the first reflective surface 301. In an embodiment of the present application, at least one film layer is coated on the first reflective surface 301, and the at least one film layer determines an intensity proportion of light reflected and transmitted by the first reflecting unit 31. It is possible to configure ingredients of the at least one film layer to fulfill the complete reflection of the first polarized light $L_S$ on the first reflective surface 301, so that the energy of the first polarized light $L_S$ is completely converted to the first reflected light $L_R$, and thereby improving an overall energy utilization of the display component 10.

Furthermore, as shown in FIG. 1, in the case where the first reflected light $L_R$ is reflected by the display unit 41 as the initial light $L_I$, the first reflecting unit 31 is within an irradiation area of the initial light $L_I$, and a transmittance in the direction of the initial light $L_I$ exceeds a second threshold, so that the initial light $L_I$ can transmit through the first reflecting unit 31. The second threshold is for example 50%, and 80% in an embodiment.

As discussed with reference to FIG. 1, in the display component of the first example according to an embodiment of the present application, the entire thickness of the first reflecting unit 31 in an exit direction of the initial light is reduced by replacing single polarization beam splitting unit (PBS) with the combination of the polarization unit 21 and the first reflecting unit 31. In addition, by controlling the complete reflection of the first polarized light $L_S$ on the first reflective surface 301, the overall energy utilization of the display component 10 is improved.

The display component according to an embodiment of the present application is not limited to the configuration with single reflecting unit. FIG. 2 is a schematic diagram illustrating the display component in a second example according to an embodiment of the present application.

Figure 2:
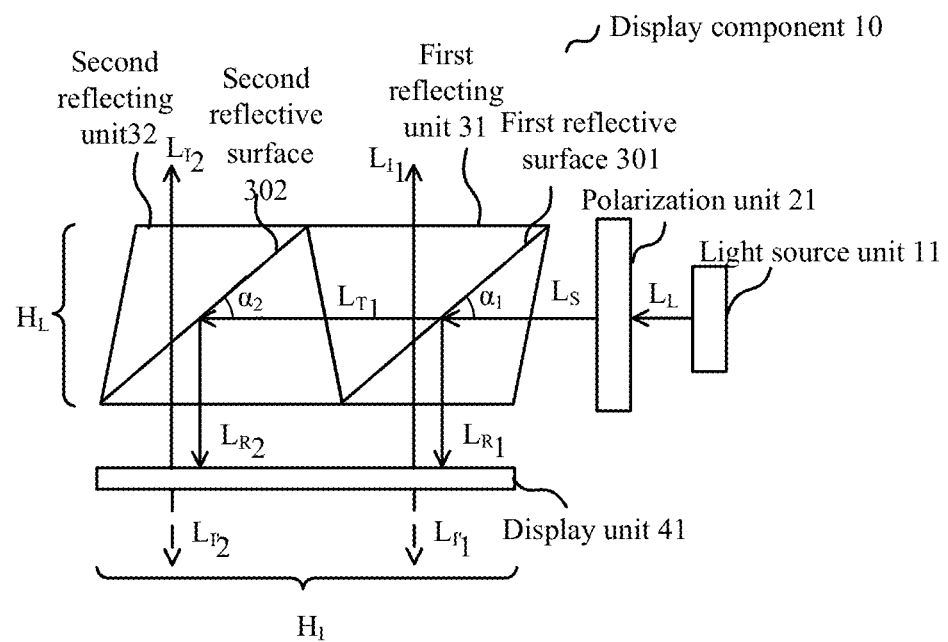
FIG. 2 is a schematic diagram illustrating the display component in a second example according to an embodiment of the present application.

As shown in FIG. 2, a display component 10 in the second example according to an embodiment of the present application comprises a second reflecting unit 32. In this case, the first reflective surface 301 is the first beam splitting surface for converting the first polarized light $L_S$ into the first reflected light $L_{R1}$ and a first transmitted light $L_{T1}$. The second reflecting unit 32 is provided within an irradiation area of first transmitted light $L_{T1}$, a second reflective surface 302 of the second reflecting unit 32 at least partially convert the first transmitted light $L_{T1}$, into a second reflected light $L_{R2}$. The second reflected light $L_{R2}$ has the same first polarization direction. It is similar to the first reflected light $L_{R1}$, the angle $\alpha_1$ between the incident plane of the second reflected light $L_{R2}$ on the second reflecting unit 32 and the second reflective surface 302 is less than 45° in case that a PBS with an approximate cube is used, that is, less than the first threshold.

Furthermore, as shown in FIG. 2, the direction of the first reflected light $L_{R1}$ matches with the direction of the second reflected light $L_{R2}$. That is, the first reflected light $L_{R1}$ and the second reflected light $L_{R2}$ are approximately parallel lights, an angle of traveling directions of the two is less than for example 5°.

The display unit 41 is provided within an irradiation area of the first reflected light $L_{R1}$ and the second reflected light $L_{R2}$ and is configured to receive the first reflected light $L_{R1}$ and the second reflected light $L_{R2}$ and adjust the first reflected light $L_{R1}$ and the second reflected light $L_{R2}$ to become initial light by adding information of an image to be displayed into the first reflected light. For example, the display unit 41 is the liquid crystal layer of the LCD display component, it can change an arrangement of internal molecules under control of a display drive voltage (not shown), cause the first reflected light $L_{R1}$ and the second reflected light $L_{R2}$ to become initial light corresponding to the image under irradiation of the first reflected light $L_{R1}$ and the second reflected light $L_{R2}$ by using the liquid crystal material to correspondingly block the first reflected light $L_{R1}$ and the second reflected light $L_{R2}$ or let the first reflected light $L_{R1}$ and the second reflected light $L_{R2}$ travel through.

In the display component 10 shown in FIG. 2, the exit direction of the initial light depends on the display principle of the display component 10 is reflective or transmissive. Specifically, in the case where the display component 10 is a reflective display component, the first reflected light $L_{R1}$ and the second reflected light $L_{R2}$ are reflected by the display unit 41 as the initial light $L_{I1}$ and $L_{I2}$ respectively. In the case where the display component 10 is a transmissive display component, the first reflected light $L_{R1}$ and the second reflected light $L_{R2}$ transmits through the display unit 41 and become the initial light $L_{I1}$, and $L_{I2}$, respectively.

Furthermore, as shown in FIG. 2, the first reflected light $L_{R1}$ irradiates a first area of the display unit 41, the second reflected light $L_{R2}$ irradiates a second area of the display unit 41, and the first area and the second area do not overlap with each other. As described above, an intensity proportion of light reflected and transmitted by each of the first reflecting unit 31 and the second reflecting unit 32 is determined by the at least one film layer that is coated on the first reflective surface 301 and the second reflective surface 302. It is possible to configure ingredients of the at least one film layer, so that an intensity difference between the first reflected light $L_{R1}$ and the second reflected light $L_{R2}$ is less than a third threshold, and further, a difference between a maximum intensity and a minimum intensity in the initial light $L_{I1}$ and $L_{I2}$ is less than a fourth threshold. Specifically, the third threshold is for example 10%, and 5% in an embodiment. Accordingly, a difference ratio (Imax−Imin)/Imax between a maximum intensity Imax and a minimum intensity Imin in the initial light $L_{I1}$ and $L_{I2}$ is less than a fourth threshold, the fourth threshold is for example 10%, and 5% in an embodiment.

As shown in FIG. 2, by configuring a plurality of reflecting units (the first reflecting unit 31 and the second reflecting unit 32), in comparison with the configuration with single first reflecting unit 31, the first reflecting unit 31 and the second reflecting unit 32 each can generate the first reflected light $L_{R1}$ and the second reflected light $L_{R2}$ covering the display unit 41, thereby further reducing the entire thickness of the first reflecting unit 31 and the second reflecting unit 32 in an exit direction of the initial light $L_{I1}$ and $L_{I2}$.

Figure 3:
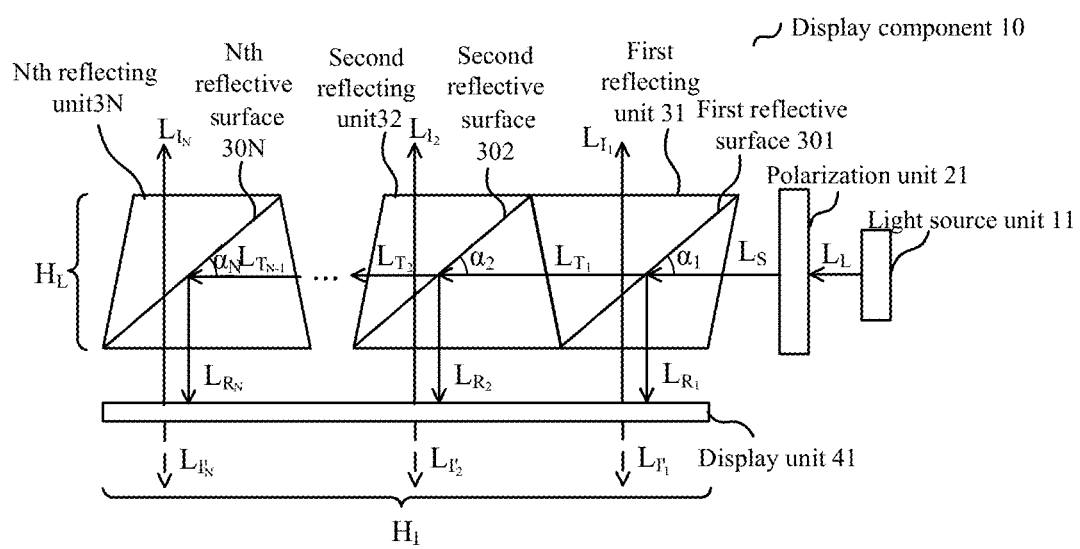
FIG. 3 is a schematic diagram illustrating the display component in a third example according to an embodiment of the present application.

FIG. 3 is a schematic diagram illustrating the display component in a third example according to an embodiment of the present application. As shown in FIG. 3, a display component 10 in the third example according to an embodiment of the present application further comprises N reflecting units (the first reflecting unit 31, the second reflecting unit 32, the N-th reflecting unit 3N, N is an integer greater than 2).

The first reflecting unit 31 and the second reflecting unit 32 are as discussed above. Furthermore, the N-th reflecting unit 3N is provided within an irradiation area of the (N−1)-th transmitted light $L_{TN-1}$, and an N-th reflective surface 30N of the N-th reflecting unit 3N completely converts the (N−1)-th transmitted light $L_{TN-1}$ into an N-th reflected light $L_{RN}$. Thus, the first reflected light $L_{R1}$ to the N-th reflected light $L_{RN}$ are the polarization light with the same first polarization state (S). Further, the first polarization light $L_S$ is completely converted to the first reflected light $L_{R1}$ to the N-th reflected light $L_{RN}$ without loss of energy.

Furthermore, each reflective surface of the N reflecting units is coated with at least one film layer that determines an intensity proportion of light reflected and transmitted by each of the N reflecting units, so that intensity of light reflected by each of the N reflecting units is 1/N of the intensity of the source light. In this way, an intensity difference between the first reflected light $L_{R1}$ and the N-th reflected light $L_{RN}$ is less than a third threshold, and further, a difference between a maximum intensity and a minimum intensity in the initial light $L_{I1}$ to $L_{IN}$ corresponding to the first reflected light $L_{R1}$ to the N-th reflected light $L_{RN}$ is less than a fourth threshold. As described above, the third threshold is for example 10%, and 5% in an embodiment. Accordingly, a difference ratio (Imax−Imin)/Imax between a maximum intensity Imax and a minimum intensity Imin in the initial light $L_{I1}$ to $L_{IN}$ is less than a fourth threshold, the fourth threshold is for example 10%, and 5% in an embodiment.

Furthermore, similar to the case with reference to FIGS. 1 and 2, since the N reflecting units 31 to 3N are provided in the display component 10 in a third example according to an embodiment of the present application, the N reflecting units 31 to 3N each can generate the first reflected light $L_{R1}$ to the N-th reflected light $L_{RN}$ covering the display unit 41, thus the entire thickness $H_L$ of the N reflecting units 31 to 3N in an exit direction of the initial light $L_{I1}$ to $L_{IN}$ is approximate 1/N of the width $H_1$ of the source light $L_L$ in the incident direction, that is, $H_L \approx H_1/N$. Therefore, by configuring the N reflecting units 31 to 3N, an overall thickness of the N reflecting units 31 to 3N in the initial light is reduced, which facilitates satisfying the requirement of miniaturizing the display component 10.

In the above, the display component according to an embodiment of the present application is described with reference to FIGS. 1 to 3, the display component according to an embodiment of the present application effectuates miniaturization of an overall volume, and takes full advantage of energy of the source light emitted by the light source unit, and meanwhile ensures a uniform illumination for the display unit. Hereinafter, an electronic device using the display component according to an embodiment of the present application will be further described with reference to FIGS. 4 to 20B.

Figure 4:
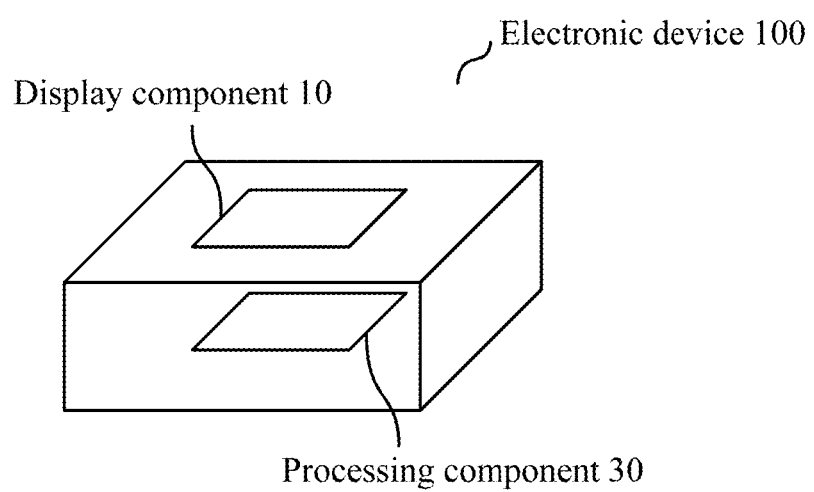
FIG. 4 is a structural block diagram illustrating an electronic device according to an embodiment of the present application.

FIG. 4 is a structural block diagram illustrating an electronic device according to a fourth embodiment of the present application. As shown in FIG. 4, the electronic device 100 according to an embodiment of the present application comprises a processing component 30 and a display component 10.

Specifically, the processing component 30 is configured to generate a first image to be displayed and execute display control. In an embodiment of the present application, the processing component 30 may be a central processing unit (CPU) of the electronic device 100 or a special graphic processing unit (GPU) or other general or special processing units.

The display component 10 is configured to execute display of the first image. In an embodiment of the present application, the display component 10 may be a display component according to the first to third embodiments of the present application described above with reference to FIGS. 1 to 3. In an embodiment of the present application, the display component 10 may comprise a light source unit, a polarization unit, a first reflecting unit, and a display unit (these units are not shown in FIG. 4). The light source unit is configured to emit source light; the polarization unit is configured to at least partially convert the source light into a first polarized light with a first polarization direction; the first reflecting unit is configured to at least partially convert the first polarized light into a first reflected light on a first reflective surface; and the display unit is configured to receive the first reflected light and adjust the first reflected light to become initial light by adding information of an image to be displayed into the first reflected light.

Specifically, the display component 10 as shown in FIG. 4 may be set within a display apparatus (not shown) of the electronic device 100. In an embodiment of the present application, the display apparatus may be a display apparatus having a near-vision optical display system that adopts a light guide optical element (LOE), it can provide the user with image or video display with a larger size or a higher resolution, break through the effect of size of the display unit per se.

Figure 5A:
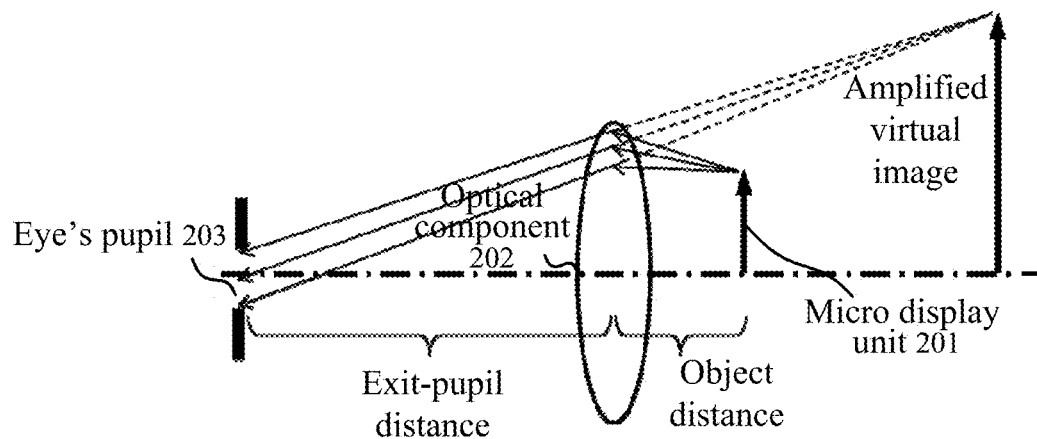
FIGS. 5A to 5D are schematic diagrams illustrating a near-vision optical display system adopted in the electronic device according to an embodiment of the present application.

FIG. 5A is a schematic diagram illustrating a near-vision optical display system adopted in the electronic device according to an embodiment of the present application. In the electronic device according to a first embodiment of the present application, a near-vision optical display system is adopted as the first display apparatus. As shown in FIG. 5A, light corresponding to the displayed image and emitted by a micro display unit 201 in the near-vision optical display system is received by a light path converting component 202 such as a lens group and the light path converting component 202 performs the corresponding light path conversion. As a result, light on which light path conversion has already been performed enters the viewer's pupil 203 to form a magnified virtual image. In FIGS. 5A to 5D, the micro display unit 201 is equivalent to the display component described above with reference to FIGS. 1 to 3.

Figure 5B:
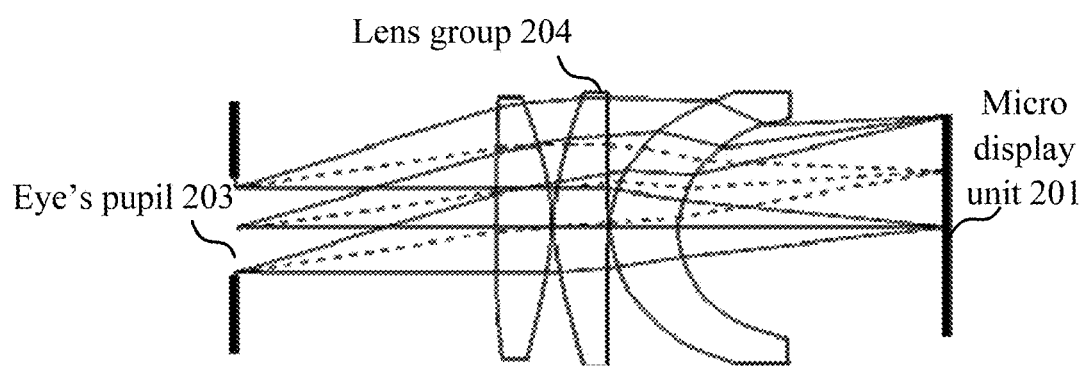
Figure 5C:
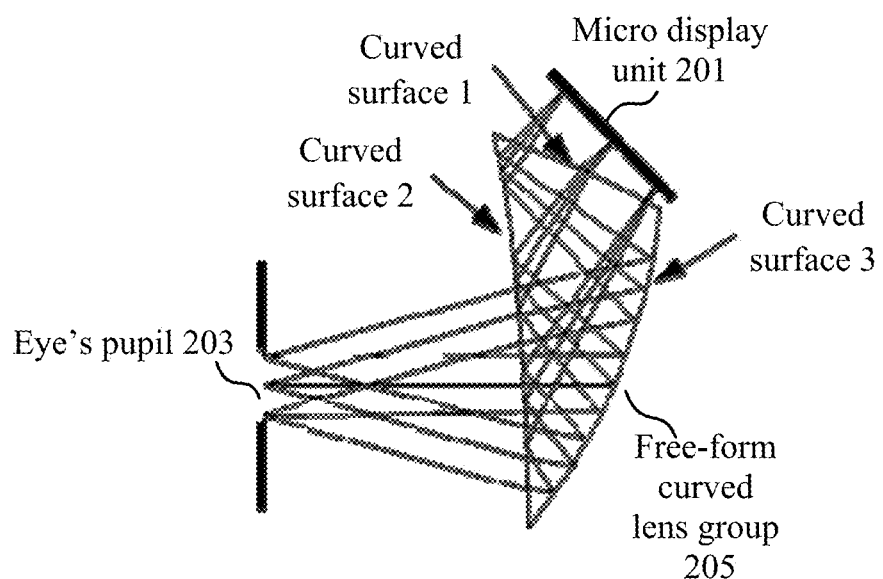
Figure 5D:
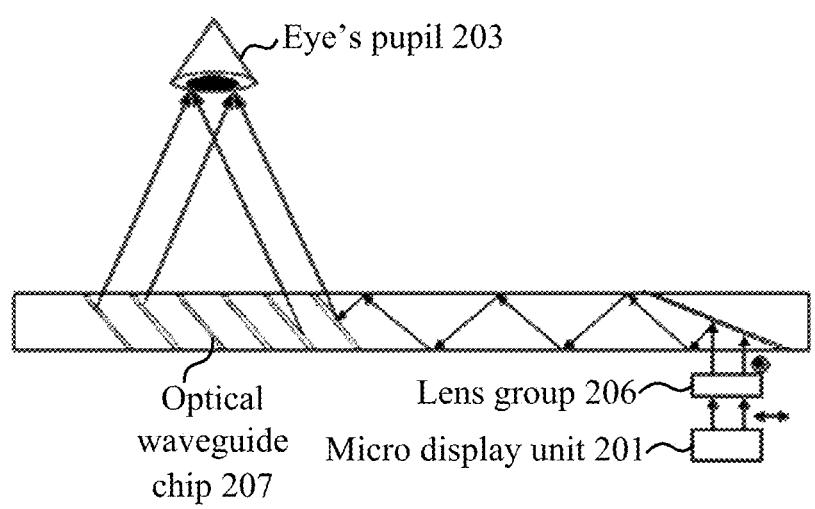

FIGS. 5B to 5D further illustrate three specific implementations based on the schematic diagram as shown in FIG. 5A. Specifically, the technical solution shown in FIG. 5B adopts a refractive-diffractive hybrid curved surface design, wherein the lens group 204 corresponds to the optical path converting component 202 shown in FIG. 5A, thereby the required lens volume is further reduced. The technical solution shown in FIG. 5C adopts a free-form curved surface design, wherein a free-form curved lens group 205 comprising a curved surface 1, a curved surface 2, and a curved surface 3 corresponds to the optical path converting component 202 shown in FIG. 5A, thereby the required lens volume is further reduced. The technical solution shown in FIG. 5D adopts a parallel plate design, which further comprises an optical waveguide chip 207, in addition to the lens group 206 corresponding to the optical path converting component 202 shown in FIG. 5A. By using the optical waveguide chip 207, in the case of reducing thickness of the required lens, control like translation is performed on the exit direction of the light that forms the amplified virtual image (i.e., display direction of the magnified virtual image). As will be readily appreciated by those skilled in the art, the near-vision optical display system adopted in the electronic device according to the first embodiment of the present application is not limited to what is shown in FIGS. 5B to 5D, other implementations like a projection eyepiece design may also be adopted instead.

Figure 6A:
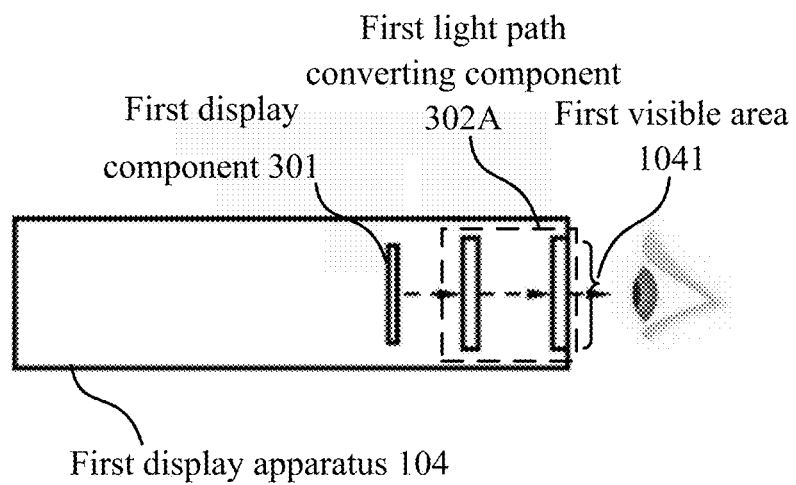
FIGS. 6A to 6C are schematic diagrams illustrating the first display apparatus in the electronic device according to an embodiment of the present application.
Figure 6B:
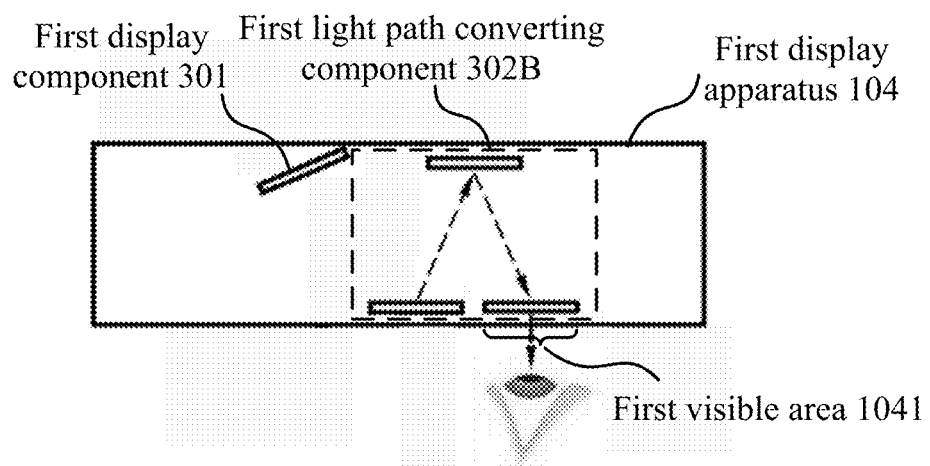
Figure 6C:
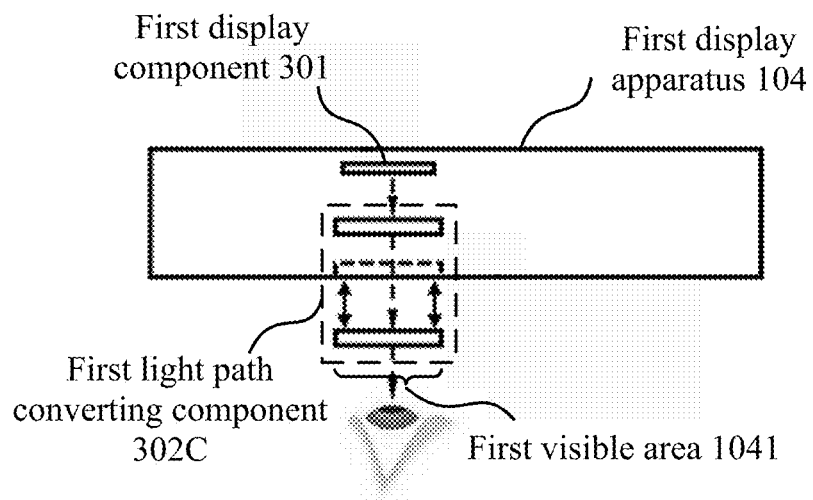

FIGS. 6A to 6C are schematic diagrams illustrating the first display apparatus in the electronic device according to an embodiment of the present application. The first display apparatus 104 in the electronic device 100 according to the first embodiment of the present application adopts the near-vision optical display system described above with reference to FIGS. 5A to 5D. The first display apparatus 104 comprises a first display component 301 configured to display the first image and a first light path converting component 302 (first light path converting component 302A to 302C in FIGS. 6A to 6C) configured to receive and perform light path conversion on the light corresponding to the first image and emitted from the first display component 301 to thereby form an amplified virtual image corresponding to the first image, so that a viewer at a particular position perceives the virtual image corresponding to the first image, wherein a size of the virtual image perceived is greater than a display size of the display component.

Specifically, in FIG. 6A, the first display component 301 may be a micro display, and the first light path converting component 302A is formed by a lens group. The lens group forms an amplified image corresponding to the first image displayed by the first display component 301.

In FIG. 6B, also, the first display component 301 may be a micro display, and the first light path converting component 302B is formed by optical devices that perform multiple reflections within the device. In this case, as compared with the first light path converting component 302A as shown in FIG. 6A, space required by the first display apparatus 104 can be saved, thereby facilitating design and manufacture of a more miniaturized electronic device.

In FIG. 6C, also, the first display component 301 may be a micro display, and the first light path converting component 302C is formed by a zooming lens group that performs telescopic zooming under driving of a drive unit (not shown) within the device. In this case, as compared with the first light path converting component 302A as shown in FIG. 6A, it is possible to dynamically adjust size of the amplified virtual image displayed by the first display apparatus 104 through zooming, thereby meeting different requirements of the user. In FIGS. 6A to 6C, the display component 301 is equivalent to the display component described above with reference to FIGS. 1 to 3

Further, the electronic device 100 shown in FIG. 4 may be a wearable electronic device or any other type of electronic device. Those skilled in the art will readily appreciate that, in the case of applying the display apparatus according to an embodiment of the present application to a wearable electronic device, the wearable electronic device may be, but not limited to, a headset or wrist-mounted electronic device. For the sake of convenience of description, description is provided with the wearable electronic apparatus like a smart watch as example.

Figure 7A:
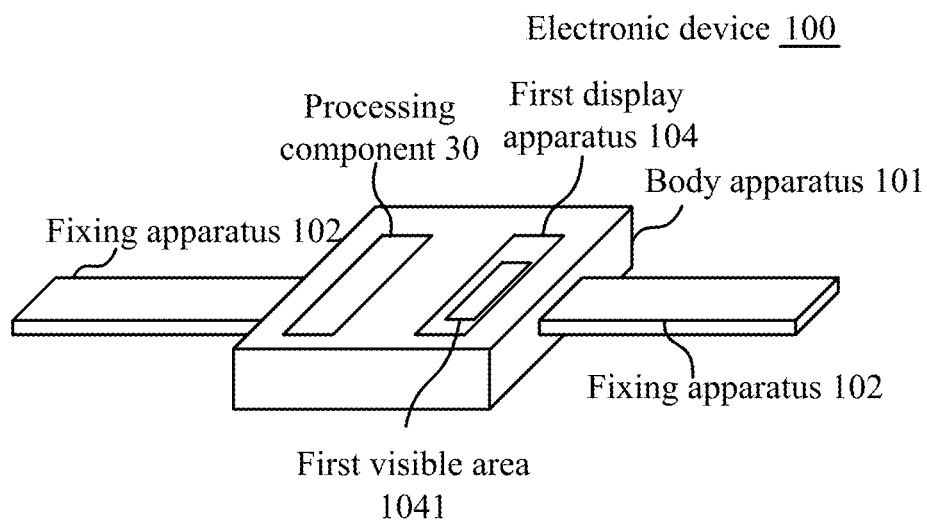
FIGS. 7A to 7E are structural block diagrams further illustrating the electronic device according to an embodiment of the present application.

FIGS. 7A to 7E are structural block diagrams illustrating an electronic device according to an embodiment of the present application. As shown in FIG. 7A, an electronic device 100 according to an embodiment of the present application comprises a body apparatus 101 and a fixing apparatus 102. The fixing apparatus 102 is connected with the body apparatus 101 and configured to fix a position relationship relative to a viewer of the electronic device 100. The fixing apparatus 102 comprises at least a fixed state in which the fixing apparatus 102 can serve as at least a portion of an annular space or an approximate annular space that satisfies a first predetermined condition, the annular space or the approximate annular space can surround periphery of a columnar body that satisfies a second predetermined condition.

Figure 7B:
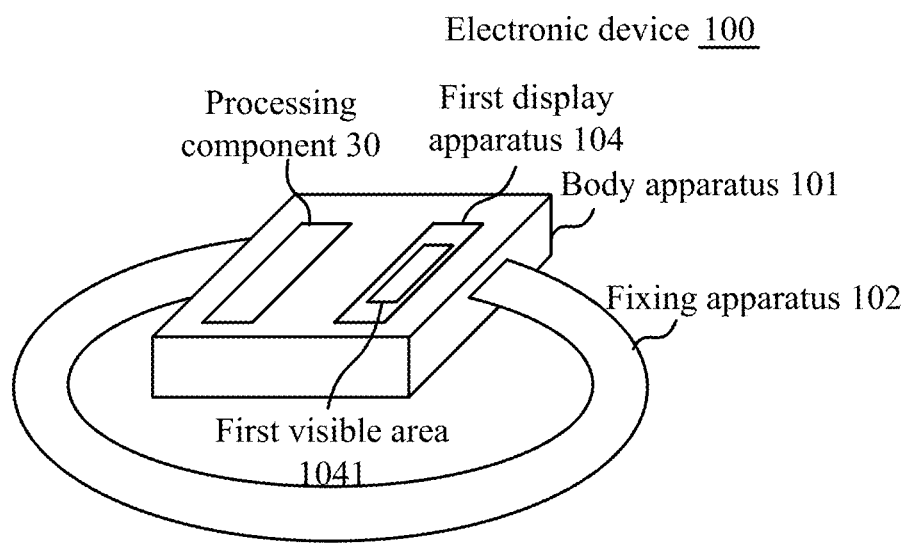
Figure 7C:
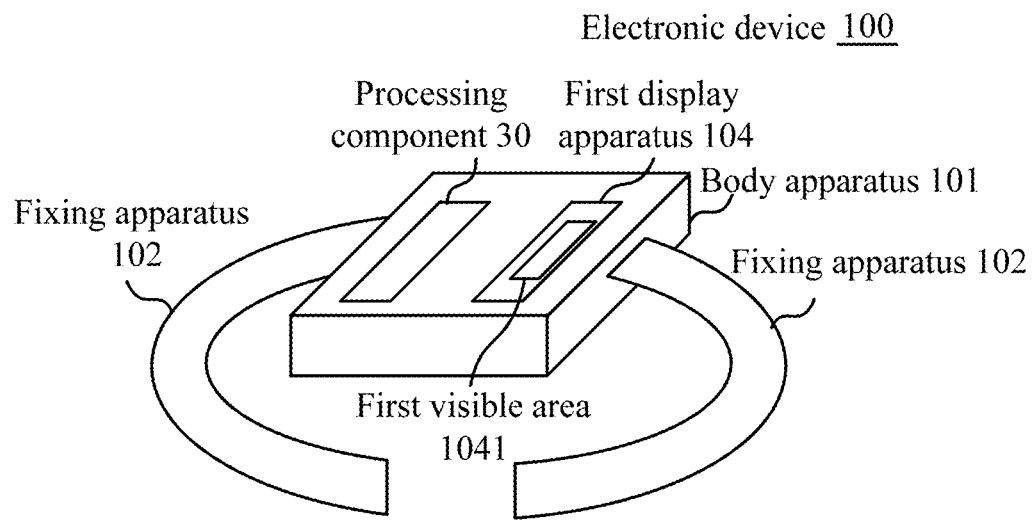

Specifically, FIGS. 7B and 7C respectively illustrate two fixed states that the fixing apparatus 102 is connected with the body apparatus 101. In a first fixed state as shown in FIG. 7B, the fixing apparatus 102 and the body apparatus 101 form a closed annular space, wherein the fixing apparatus 102 and the body apparatus 101 constitute a portion of the annular space, respectively. In a second fixed state as shown in FIG. 7C, the fixing apparatus 102 and the body apparatus 101 form an approximate annular space with a small opening, wherein the fixing apparatus 102 and the body apparatus 101 constitute a portion of the approximate annular space, respectively, a width of the small opening of the approximate annular space is less than a diameter of the columnar body (i.e., the first predetermined condition). In an embodiment of the present application, the body apparatus 101 is a dial portion of a smart watch, and the fixing apparatus 102 is a strap portion of the smart watch. The annular space or the approximate annular space formed by the fixing apparatus 102 and the body apparatus 101 can surround the wrist of the user of the smart watch which serves as the columnar body, and a diameter of the annular space or the approximate annular space is greater than a diameter of the user's wrist and smaller than a diameter of the user's fist (i.e., the second predetermined condition).

Figure 7D:
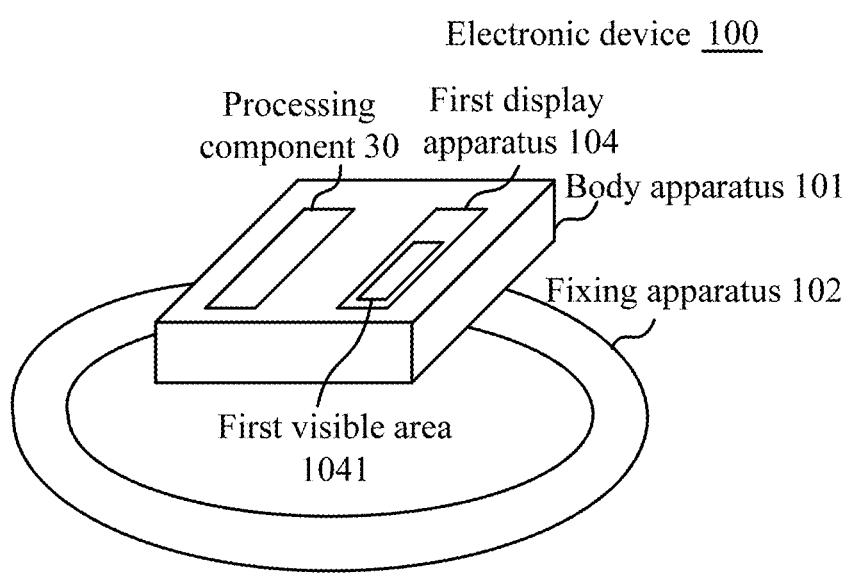
Figure 7E:
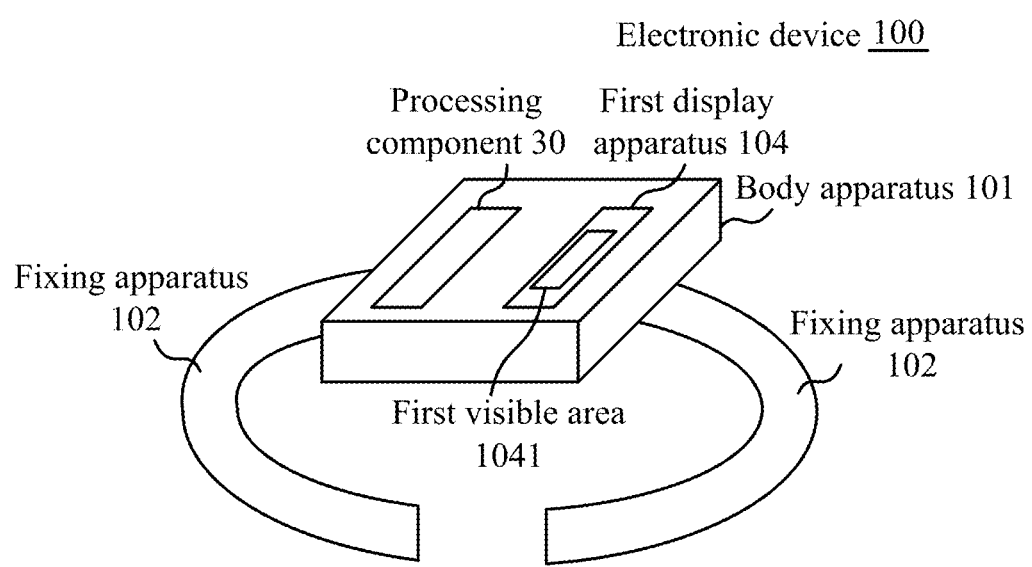

Further, of course, the annular space or the approximate annular space may be formed by the fixing apparatus 102 alone. As shown in FIGS. 7D and 7E, the body apparatus 101 may be provided on the fixing apparatus 102 (i.e., the body apparatus 101 is attached to the fixing apparatus 102 in the manner of surface contact), so that the fixing apparatus 102 alone forms the annular space (FIG. 7D) or the approximate annular space (FIG. 7E) that surrounds the columnar body. The fixing apparatus 102 is arranged with a fixing mechanism like hasps, snaps, zippers and so on (not shown).

Further, as shown in FIGS. 7A to 7E, a processing unit 103 and a first display apparatus 104 are arranged on the body apparatus 101. The processing unit 103 is configured to generate a first image and execute display control. In the electronic device 100 shown in FIGS. 7A to 7E, the first display apparatus 104 is arranged on the body apparatus 101. However, as will be readily appreciated by those skilled in the art, the present application is not limited thereto, in another embodiment of the present application, the first display apparatus 104 may also be arranged on the fixing apparatus 102. In yet another embodiment of the present application, the first display apparatus 104 may also be arranged on the body apparatus 101 and the fixing apparatus 102. For example, as will be further described in detail, the first display apparatus 104 will further comprise a light path converting component and a display component, the light path converting component may be provided partially on the body apparatus 101 and partially on the fixing apparatus 102; the display component may be provided on the body apparatus 101 or the fixing apparatus 102 as needed. As will be readily appreciated, the display component may be the display component according to an embodiment of the present application as described above with reference to FIGS. 1 to 3.

Further, as shown in FIGS. 7A to 7E, the first display apparatus 104 comprises a first visible area 1041, light corresponding to the first image exits from the first visible area 1041. The electronic device 100 has a first viewing area, a complete display content of the first image can be perceived when viewing the first visible area within the first viewing area.

Figure 8:
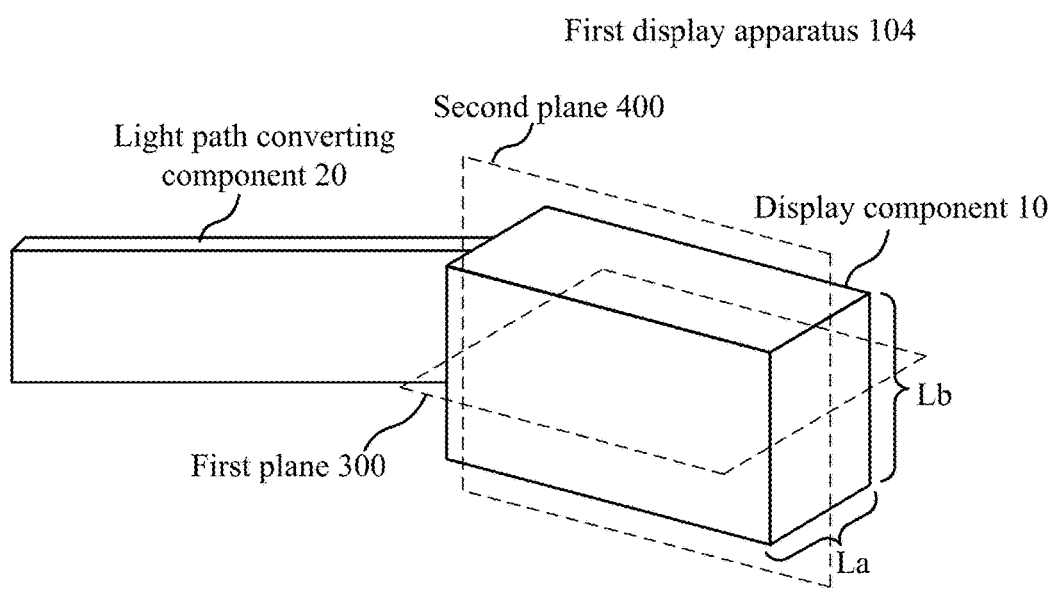
FIG. 8 is a structural block diagram illustrating the display apparatus in the electronic device according to an embodiment of the present application.

FIG. 8 is a structural block diagram illustrating a first display apparatus 104 according to an embodiment of present application. For simplicity of the illustration, FIG. 8 only illustrates the first display apparatus that comprises the display component 10 and the light path converting component 20, internal configurations of the display component 10 and the light path converting component 20 as well as the light path are not shown in FIG. 8.

As illustrated in FIG. 8, light that forms the first image in the display component 10 is on a first plane 300, light that forms the virtual image corresponding to the first image and exits from the light path converting component 20 is on a second plane 400, there is a first angle between the first plane 300 and the second plane 400. In an embodiment of the present application, the first angle is 90 degrees. In this case, a first size La of the display component in a direction vertical to the first plane is made smaller than a second size Lb of the display component in a direction parallel to the first plane. Thus, when the display apparatus 104 is provided within a wearable electronic device, for example, when the electronic device is smart glasses, the display component 10 is provided within a frame at one side (i.e., glass leg) of the smart glasses, it is such configured so that thickness of the frame within which the display component 10 is provided is thinner. Similarly, when the electronic device is a smart watch, the display component 10 is provided within a wrist strap at one side of the smart watch, and it is such configured so that thickness of the wrist strap within which the display component 10 is provided is thinner. Accordingly, the display component 10 according to the first exemplary embodiment of the present application achieves a thickness reduction in a specific direction, and thereby achieves a thickness reduction in a specific direction where the display apparatus 104 is provided.

Figure 9A:
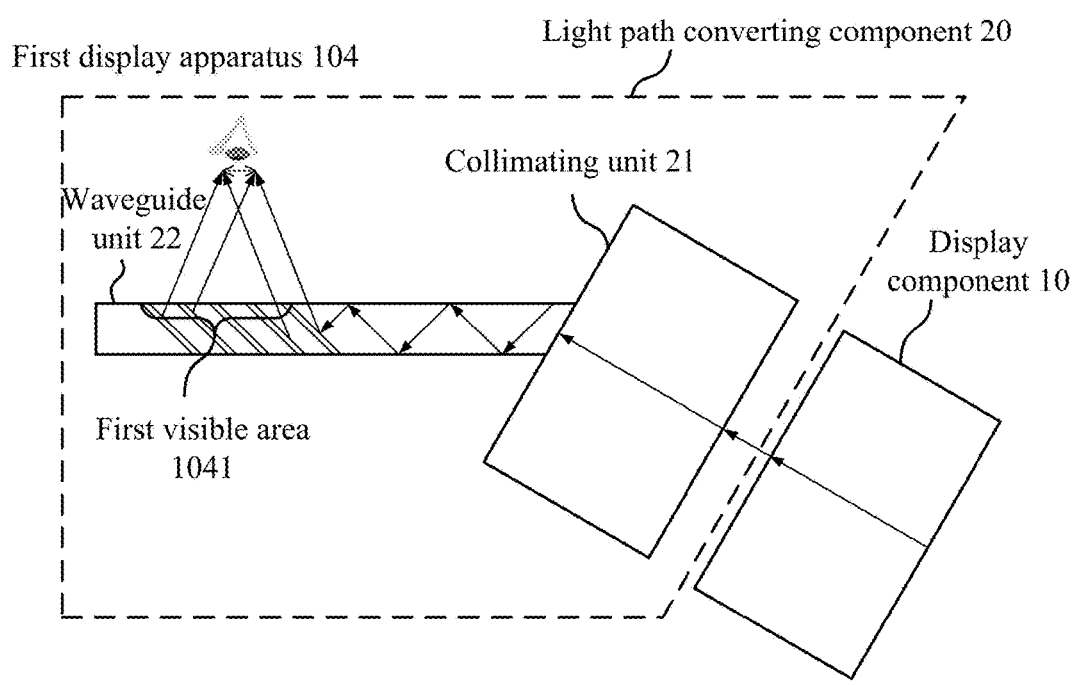
FIGS. 9A and 9B are structural block diagrams further illustrating the display apparatus in the electronic device according to an embodiment of the present application.
Figure 9B:
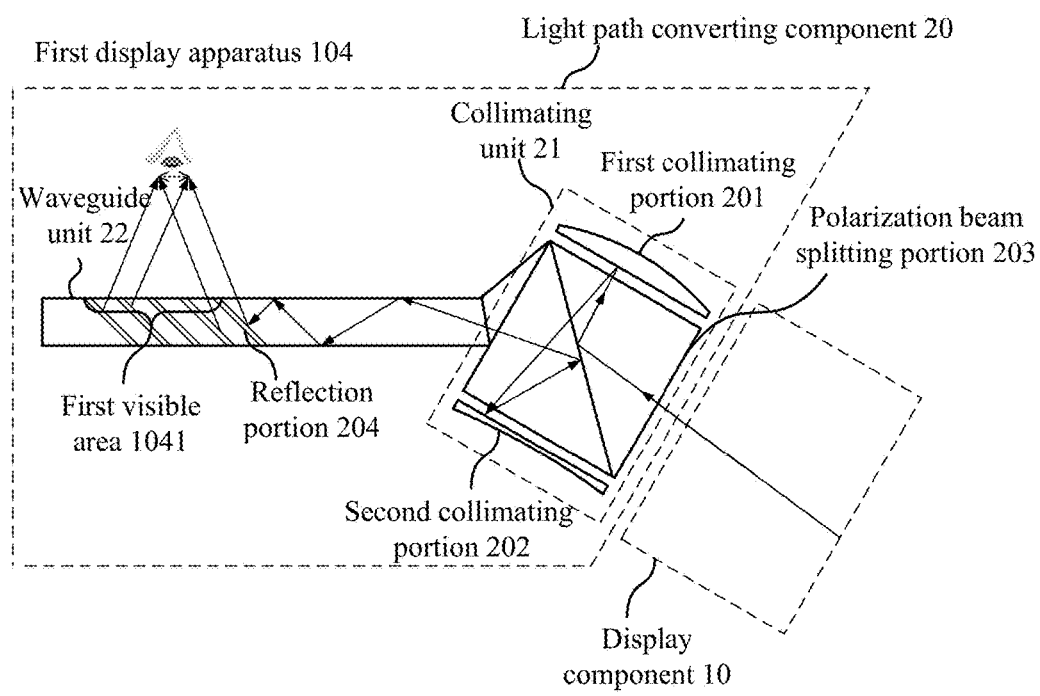

FIGS. 9A and 9B are structural block diagrams further illustrating the display apparatus in the electronic device according to an embodiment of the present application. As shown in FIG. 9A, the first the first display apparatus 104 comprises a display component 10 and a light path converting component 20, the display component 10 is configured to display the first image, the light path converting component 20 is configured to perform light path conversion on the light corresponding to the first image and emitted from the display component 10 to form a magnified virtual image corresponding to the first image:

Further, as shown in FIG. 9B, the light path converting component 20 further comprises a collimating unit 21 and a waveguide unit 22, the collimating unit 21 is configured to collimate the initial light corresponding to the first image and coming from the display component 10 into collimated light corresponding to the first image, and lead the same into the waveguide unit 22. Specifically, the collimating unit 21 comprises a first collimating portion 201 and a second collimating portion 202 provided opposite to each other, and a polarization beam splitting portion 203 provided between the first collimating portion 201 and the second collimating portion 202, the initial light corresponding to the first image and coming from the display component 10 is reflected by the polarization beam splitting portion 203 to the first collimating portion 201, thereafter it is collimated by the first collimating portion 201 and the second collimating portion 202, and exited by the polarization beam splitting portion 203 as the collimated light corresponding to the first image. The waveguide unit 22 guides the collimated light corresponding to the first image and coming from the collimating unit 21 to the particular position, wherein the collimated light corresponding to the first image is for forming the virtual image corresponding to the first image. In an embodiment of the present application, the first collimating portion 201 and the second collimating portion 202 may be a single lens or a lens group as needed by design. It is possible to implement adjustment of a size of the virtual image corresponding to the first image by adjusting the relative position of the lens or lens group by which the first collimating portion 201 and the second collimating portion 202 are configured. In addition, as shown in FIG. 9B, the waveguide unit 22 further comprises a plurality of reflection portions 204, it is possible to control to guide the collimated light from the collimating unit 21 and corresponding to the first image to the particular position to exit, by setting the position and angle of the plurality of reflection portions 204.

Figure 10A:
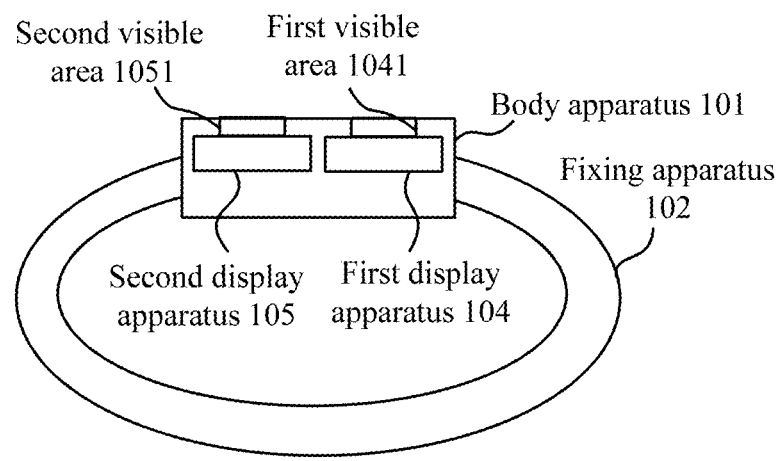
FIGS. 10A and 10B are structural block diagrams further illustrating the electronic device according to another embodiment of the present application.
Figure 10B:
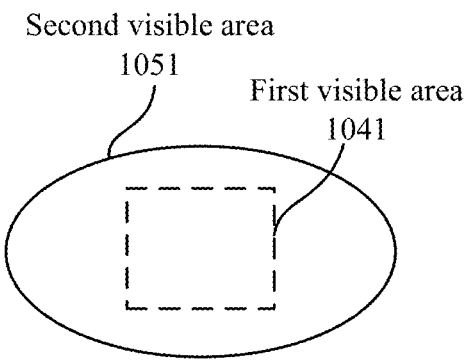

FIGS. 10A and 10B are structural block diagrams further illustrating the electronic device according to another embodiment of the present application. As shown in FIG. 10A, in addition to the first display apparatus 104 described above, a second display apparatus 105 is further comprised. The second display apparatus 105 is provided on the body apparatus 101 and/or the fixing apparatus 102 and configured to output a second image. In the example shown in FIG. 10A, the first display apparatus 104 and the second display apparatus 105 are set schematically in parallel. The present application is not limited thereto, the first display apparatus 104 and the second display apparatus 105 may be set overlapped or at least partially overlapped. Like the first display apparatus 104, the second display apparatus 105 has a second visible area 105I, light corresponding to the second image exits from the second visible area 105I.

In an embodiment of the present application, the first display apparatus 104 and the second display apparatus 105 are display units that follow different display principles. Specifically, the first display apparatus 104 is a display unit having a near-vision optical display system that adopts a light guide optical element (OLE), the second display apparatus 105 is an ordinary display like a liquid crystal display (LCD), an organic electroluminescent display, an E-ink display etc.

FIG. 10B schematically shows a cross-section shape of the first viewing area 1041 of the first display apparatus 104 and the second viewing area 105I of the second display apparatus 105. As shown in FIG. 10B, the cross-section shape of the first viewing area 1041 may be a rectangular adaptive to the viewing habits that the user uses the first display apparatus 104 having a near-vision optical display system that adopts a light guide optical element (OLE). The cross-section shape of the second viewing area 105I may be oval or circular adaptive to an outer shape of the wearable electronic device like a smart watch.

Figure 11:
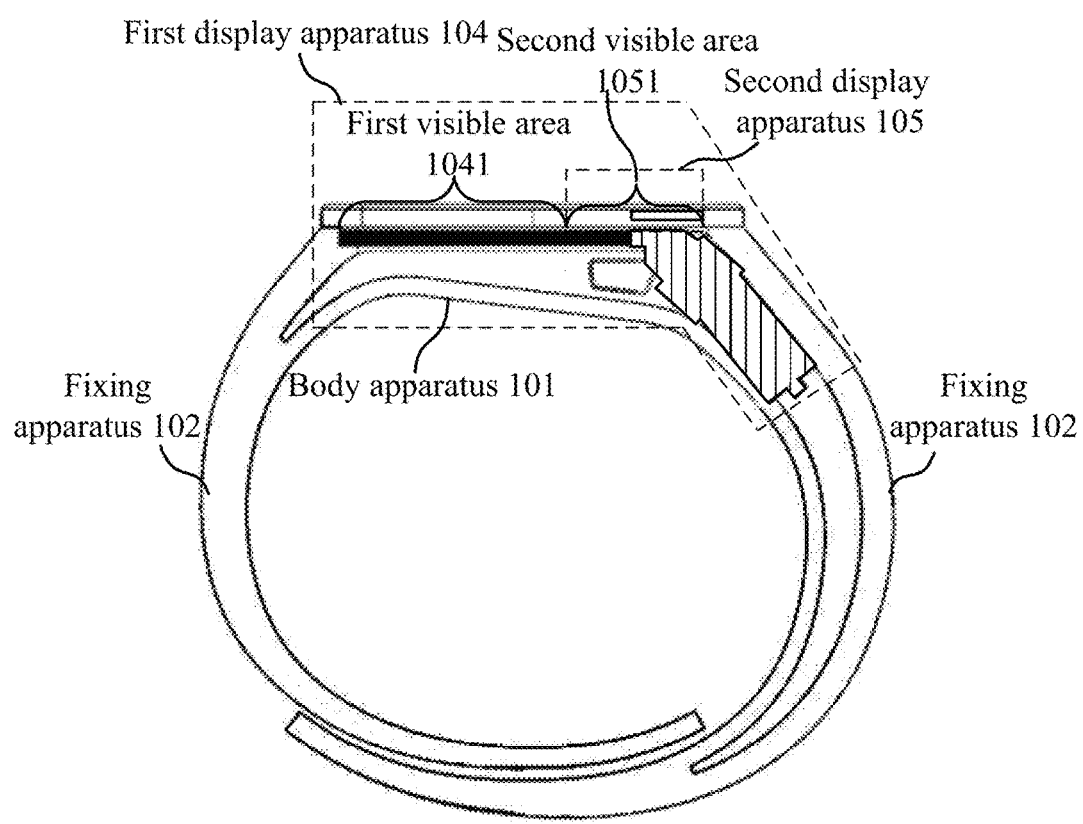
FIG. 11 is a structural perspective diagram illustrating the electronic device according to an embodiment of the present application.

FIG. 11 is a structural perspective diagram illustrating the electronic device according to an embodiment of the present application. As shown in FIG. 11, the first display apparatus 104 has a first visible area 1041, the second display apparatus 105 has a second visible area 105I, an edge where the first visible area 1041 and the second visible area 105I border on each other is a curve. As can be seen from FIG. 11, in order to concurrently configure the first display apparatus 104 and the second display apparatus 105 in the electronic device 100, the second display apparatus 105 needs to satisfy being an irregular shape and a narrow frame.

Hereinafter, the second display apparatus 105 will be further described with reference to FIGS. 12 to 20B.

The second display unit according to an embodiment of the present application may be a second display unit such as a liquid crystal display, an LED display, a plasma display or the like to which a drive signal needs to be provided.

Figure 12:
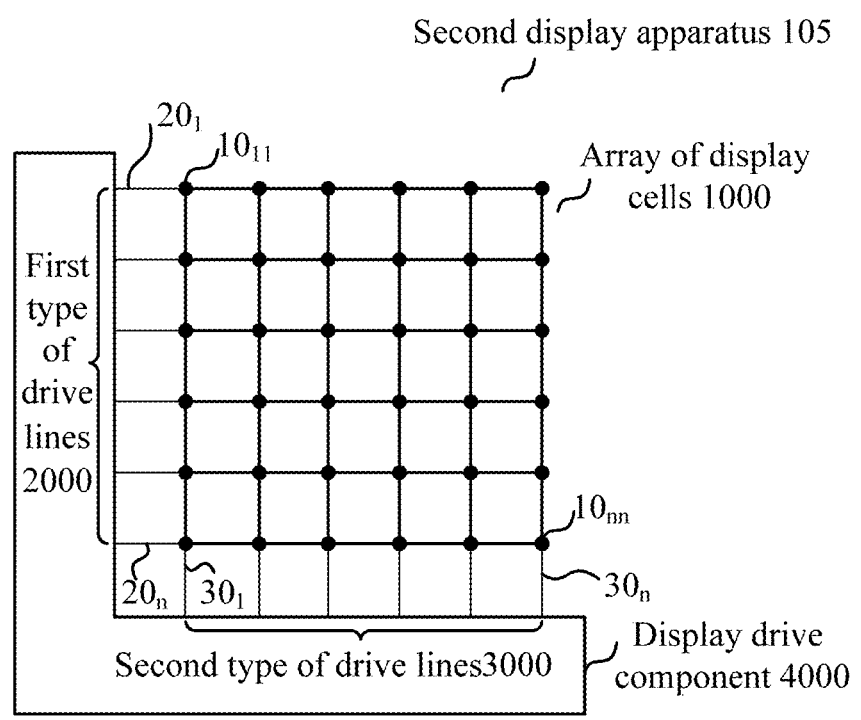
FIG. 12 is a structural block diagram briefly illustrating the second display apparatus according to an embodiment of the present application.

FIG. 12 is a structural block diagram briefly illustrating the second display unit according to an embodiment of the present application. As shown in FIG. 12, the second display apparatus 105 comprises an array of display cells 1000, a plurality of first type of drive lines 2000, a plurality of second type of drive lines 3000, and a display drive component 4000. Specifically, the array of display cells 1000 comprises a plurality of display sub-units $10_{11}, \ldots 10_{nn}$. As can be readily appreciated, the array of display cells 1000 composed by a plurality of display sub-units as shown in FIG. 12 is merely illustrative, wherein the number of the plurality of display sub-units and their specific layout may vary depending on the design and use requirements. Each ($20_1 \ldots 20_n$) of the plurality of first type of drive lines 2000 intersects with each ($30_1 \ldots 30_n$) of the plurality of second type of drive lines 3000, intersection thereof corresponds to each display sub-unit of the plurality of display sub-units ($10_{11} \ldots 10_{nn}$), so as to provide a display drive signal for each display sub-unit. The display drive component 4000 is connected with the plurality of first type of drive lines and the plurality of second type of drive lines, so as to provide a display drive signal for the plurality of first type of drive lines and the plurality of second type of drive lines.

Different than the configuration manner that a plurality of first type of drive lines and a plurality of second type of drive lines are connected respectively to a horizontal drive unit and a vertical drive unit in the related art, the second display apparatus 105 according to an embodiment of the present application may comprise only a single display drive component 4000, thereby wiring space needed for arranging the display drive component is saved and design complexity is simplified. In addition, in the second display apparatus 105 according to an embodiment of the present application, the plurality of first type of drive lines 2000 and the plurality of second type of drive lines 3000 are divided into at least two groups of drive lines, each group of the at least two groups of drive line is connected to the display drive component 4000. Such way of connecting the drive lines in group will greatly reduce the edge wiring of the second display apparatus 105, so that the frame that packets it can become narrow as much as possible and flexibly adapt to different frame shapes. Specific configurations of the second display unit according to the embodiment of the present application will be further described below with reference to FIGS. 13A to 20B.

Figure 13A:
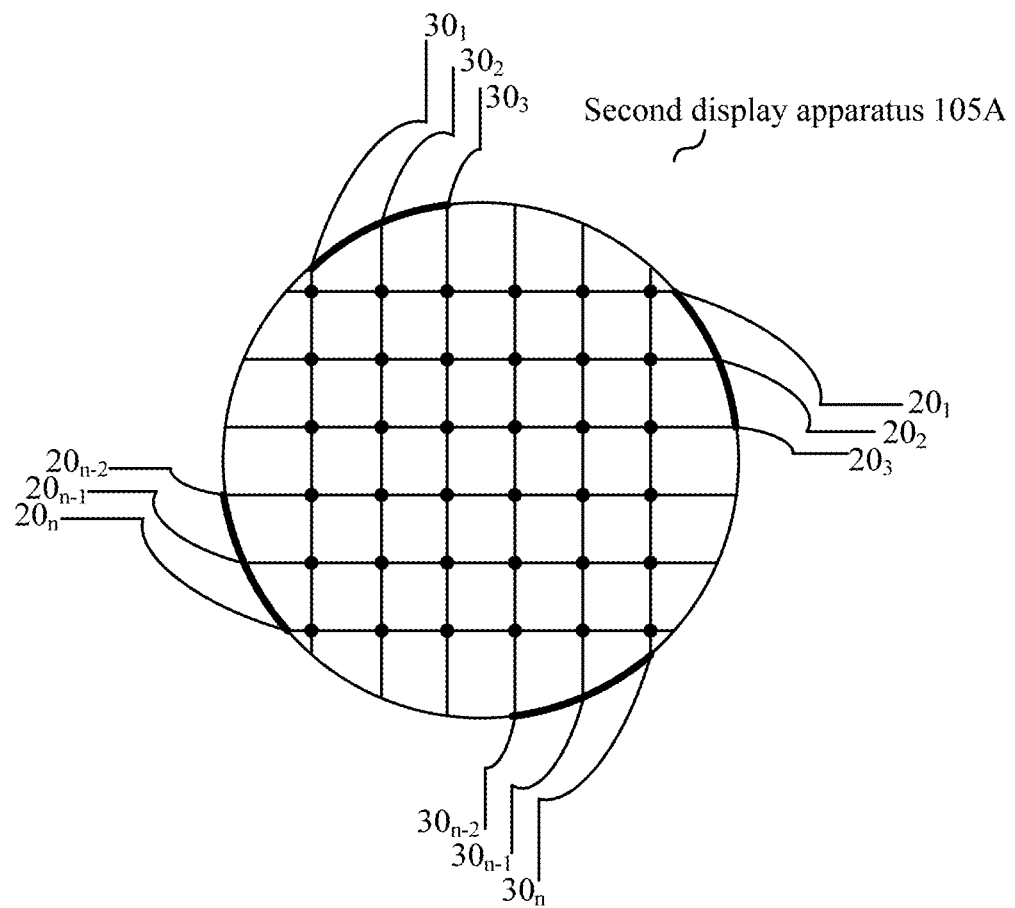
FIGS. 13A to 13C are a top surface view, a bottom surface view, and a side view illustrating a first example of the second display apparatus according to an embodiment of the present application.
Figure 13B:
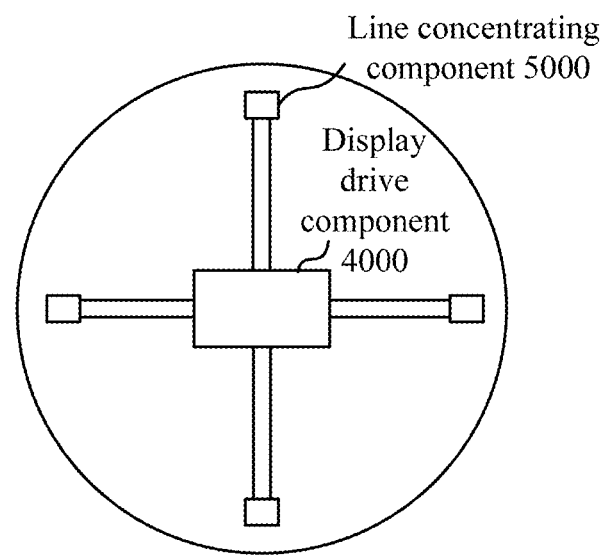
Figure 13C:
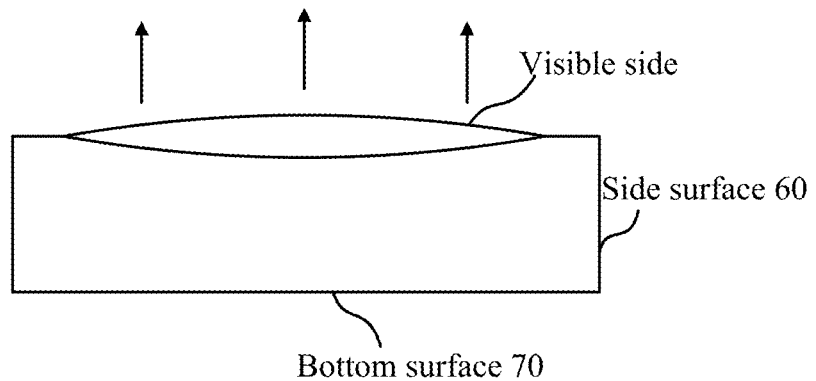

FIGS. 13A to 13C are a top surface view, a bottom surface view, and a side view illustrating a first example of the second display unit according to an embodiment of the present application. Specifically, FIG. 13A is a top surface view illustrating a second display apparatus 105A according to the first embodiment of the present application. As can be readily appreciated, the number of the drive lines and the wiring manner as shown in FIG. 13A are merely illustrative, the second display apparatus 105A according to an embodiment of the present application is not limited thereto. As shown in FIG. 13A, the plurality of first type of drive lines and the plurality of second type of drive lines are divided into a plurality of groups of drive lines (four groups as shown in FIG. 13A). As can be seen from FIG. 13A, by adopting such grouped wiring manner, the wiring area at the edge of the second display apparatus 105A tends to cluster, which thereby facilitates further narrowing the frame of the second display apparatus 105A. That is to say, in an electronic device where the second display apparatus 105A according to an embodiment of the present application is configured, the second display apparatus 105A can adapt to the shape of the electronic device as needed. Specifically, by adopting grouped configuration for the wiring of the second display apparatus 105A, it is possible to select the edge of the second display apparatus 105A that adapt to wiring based on the shape of the electronic device as the area where wiring groups are configured, and select not to configure wiring at the edge having no wiring space of the second display apparatus 105A based on the shape of the electronic device. Herein, the edge having no wiring space of the second display apparatus 105A may be an edge where the edge of the second display apparatus 105A substantially overlaps with the outer frame of the electronic device per se. Alternatively, the edge of having no wiring space the second display apparatus 105A may be an edge of the electronic device where the outer frame thereof is of an irregular shape and thus is inconvenient for wiring. Detailed examples will be described below with reference to the drawings.

Further, FIG. 13B is a bottom surface view illustrating a second display apparatus 105A according to the fourth embodiment of the present application. As shown in FIG. 13B, the second display apparatus 105A further comprises a plurality of line concentrating components 5000, each group of the plurality of groups of drive lines, into which the plurality of first type of drive lines and the plurality of second type of drive lines are divided, is connected to the display drive component 4000 via one of the line concentrating components 5000, number of input terminals of one of the line concentrating components 5000 connected with each group of the at least two groups of drive lines is M, number of output terminals connected to the display drive component 4000 is N, and M>N. In the embodiment shown in FIG. 13B, number of the input terminals by which one of the line concentrating components 5000 and one group of drive lines are connected is three, and number of the output terminals connected to the display drive component 4000 is two. Adopting such wiring manner of connecting the display drive unit via the line concentrating unit after grouping, it is possible to further reduce the number of wiring needed for executing display drive. Of course, as can be readily appreciated, the second display apparatus 105A according to an embodiment of the present application is not limited thereto, instead, the grouped group of drive lines may be directly connected to the display drive component 4000 without the line concentrating component 5000.

Furthermore, FIG. 13C is a side view illustrating a second display apparatus 105A according to the fourth embodiment of the present application. As shown in FIG. 13C, a side of the surface where the array of display cells 1000 residues is a visible side, and at least a portion of the plurality of first type of drive lines 2000 and the plurality of second type of drive lines 3000 and the display drive component 4000 are provided at the other side of the surface. In particular, the display drive component 4000 is located at a bottom surface 7000 of the second display apparatus 105A, the second display apparatus 105A further comprises a side surface 60 that connects an edge of the surface where the array of display cells 10 residues and the bottom surface 70, the plurality of first type of drive lines 2000 and the plurality of second type of drive lines 3000 are provided along the side surface 60. In the side view as shown in FIG. 13C, a distance from a projection, on a plane vertical to the visible direction (that is, the bottom surface 70), of part of the plurality of first type of drive lines 2000 and the plurality of second type of drive lines 3000 on the surface where the array of display cells 10 residues to the edge of the surface where the array of display cells 1000 residues is L. The distance L satisfies being less than a predetermined threshold. The predetermined threshold may be set as needed by design and display requirements, for example, it may be set as ten mm, five mm, or one mm. Even in the case of grouped wiring, the distance L may be zero. That is to say, at the edge where the drive lines do not turn downward so as to connect the display drive component 4000, it is possible that there is no wiring for the drive lines, and at the edge of this portion, the frame other than the visible area on the surface where the array of display cells 1000 residues is the narrowest.

Figure 14A:
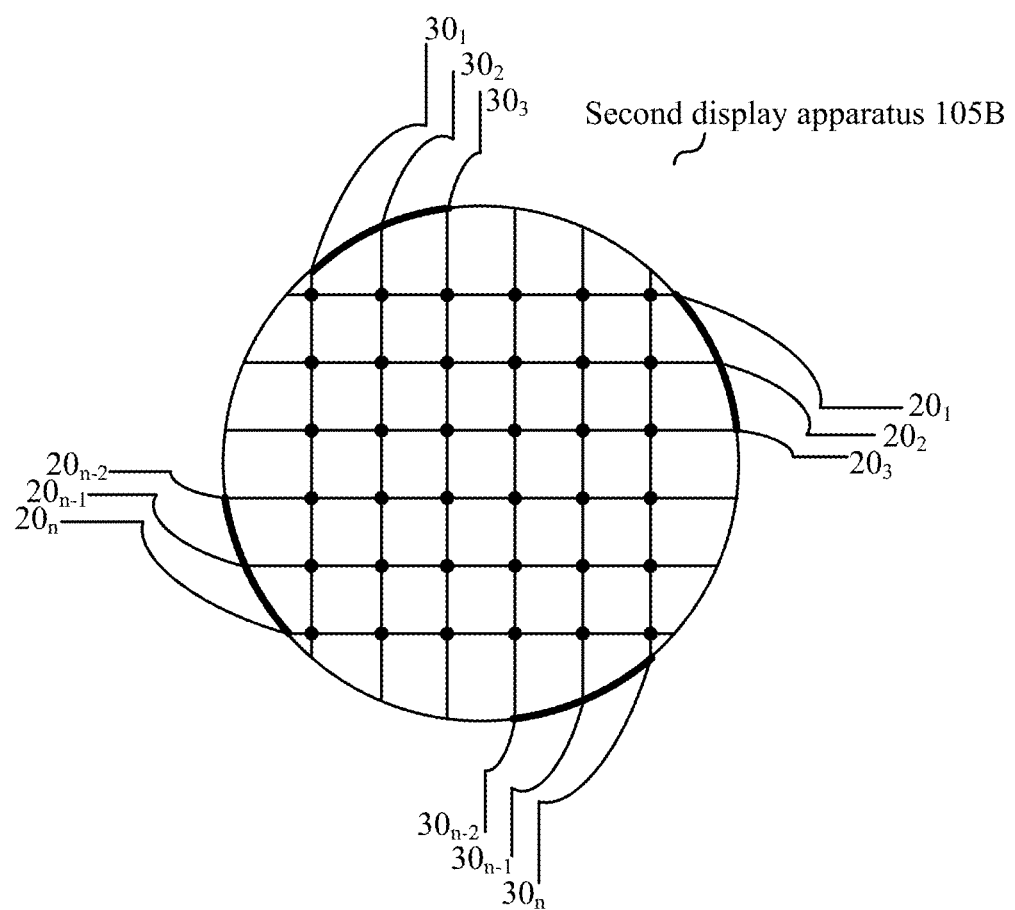
FIGS. 14A to 14B are schematic diagrams illustrating a second example of the second display apparatus according to an embodiment of the present application.
Figure 14B:
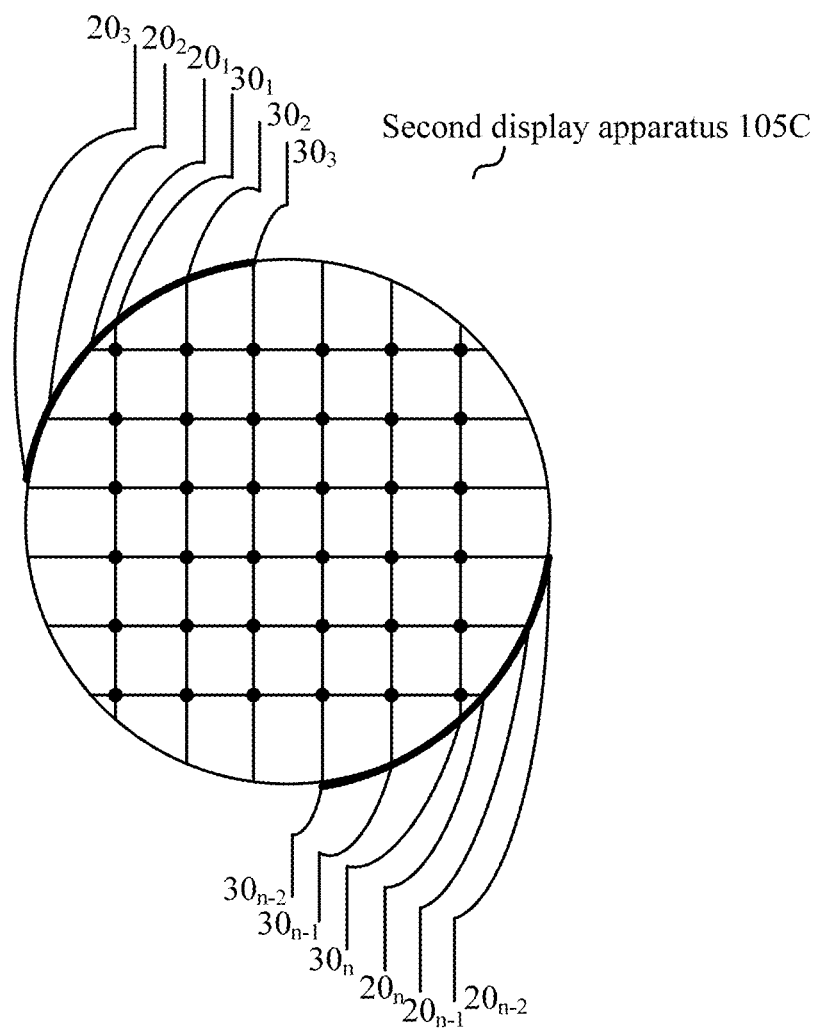

FIGS. 14A to 14B are schematic diagrams illustrating a second example of the second display unit according to an embodiment of the present application. In the second display units 105B and 105C according to the embodiment of the present application, each group into which the plurality of first drive lines and the plurality of second drive lines are divided may comprise only the first type of drive lines or the second type of drive lines, or each group into which the plurality of first drive lines and the plurality of second drive lines are divided may comprise the first type of drive lines and the second type of drive lines. Specifically, as shown in FIG. 14A, in the second display apparatus 105B according to the embodiment of the present application, each group into which the plurality of first drive lines and the plurality of second drive lines are divided may comprise only the first type of drive lines (the group composed by $20_1, 20_2, 20_3$ and the group composed by $20_{n-2}, 20_{n-1}, 20_n$) or the second type of drive lines (the group composed by $30_1, 30_2, 30_3$ and the group composed by $30_{n-2}, 30_{n-1}, 30_n$). In contrast, as shown in FIG. 14B, in the second display units 105C according to the embodiment of the present application, each group into which the plurality of first drive lines and the plurality of second drive lines are divided may comprise the first type of drive lines (the group composed by $20_1, 20_2, 20_3, 30_1, 30_2, 30_3$) and the second type of drive lines (the group composed by $20_{n-2}, 20_{n-1}, 20_n, 30_{n-2}, 30_{n-1}, 30_n$). As can be seen from FIGS. 14A to 14B, adopting such grouped wiring manner, the grouping manner of the plurality of first drive lines and the plurality of second drive lines is more flexible, the drive lines can be selected to compose the group as needed by design and display requirements, without being restricted by the type of the drive lines per se.

Figure 15A:
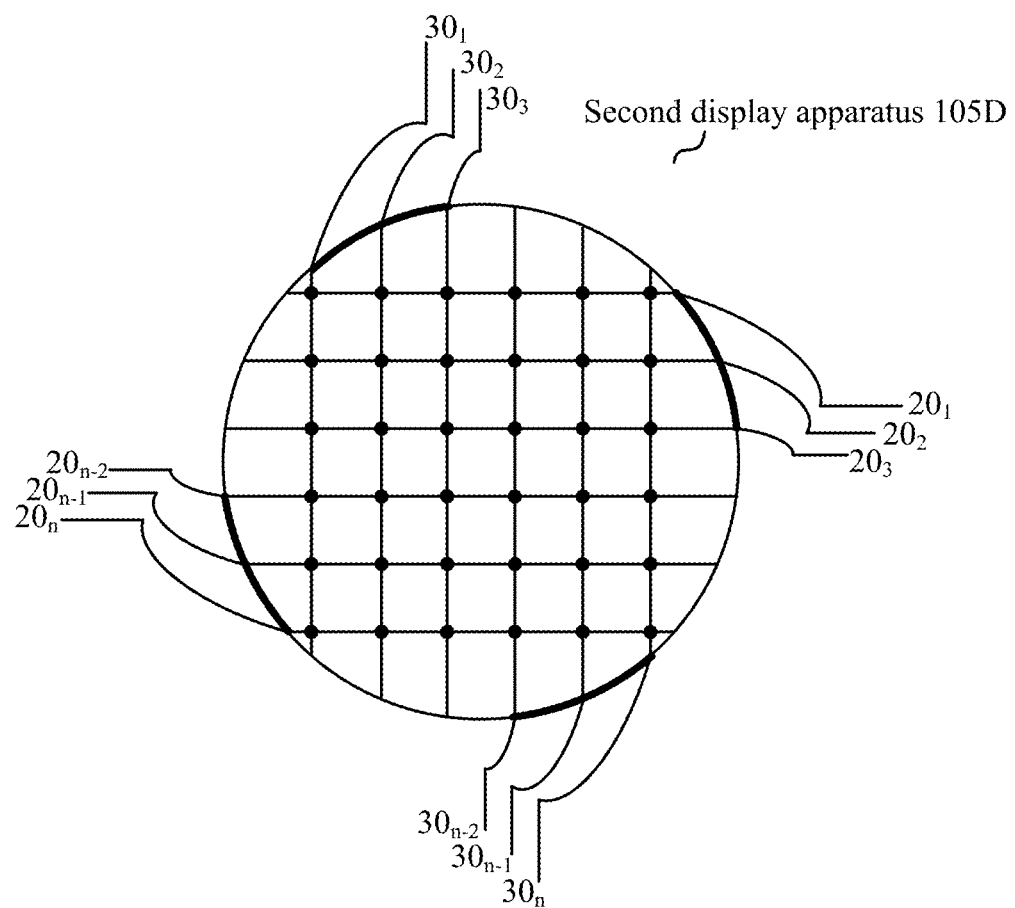
FIGS. 15A to 15B are schematic diagrams illustrating a third example of the second display apparatus according to an embodiment of the present application.
Figure 15B:
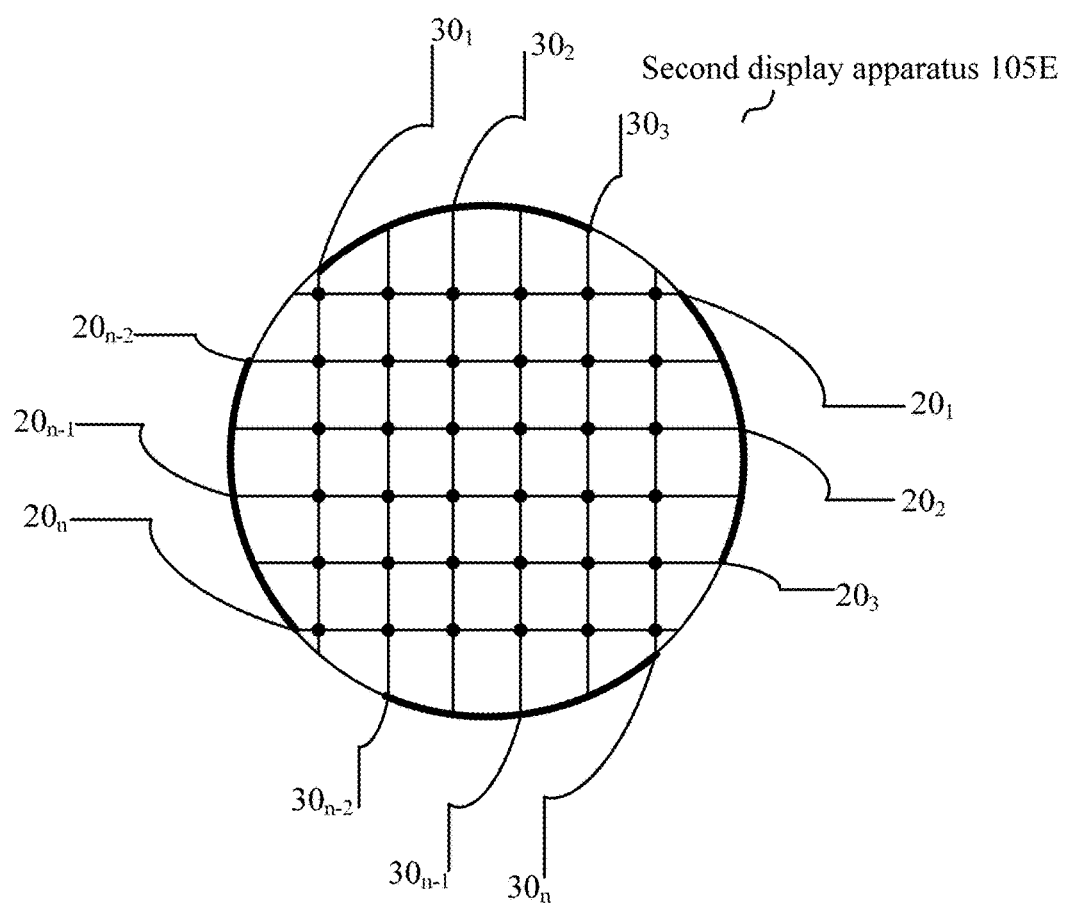

FIGS. 15A to 15B are schematic diagrams illustrating a third example of the second display unit according to an embodiment of the present application. In the second display units 105D and 105E according to the embodiment of the present application, each group into which the plurality of first drive lines and the plurality of second drive lines are divided may comprise only adjacent drive lines, or each group into which the plurality of first drive lines and the plurality of second drive lines are divided may comprise drive lines that are not adjacent. Specifically, as shown in FIG. 15A, in the second display apparatus 105D according to the embodiment of the present application, each group into which the plurality of first drive lines and the plurality of second drive lines are divided may comprise only adjacent drive lines (e.g., the group composed by adjacent $20_1$, $20_2$, $20_3$; $20_{n-2}$, $20_{n-1}$, $20_n$; $30_1$, $30_2$, $30_3$; $30_{n-2}$, $30_{n-1}$, $30_n$). In contrast, as shown in FIG. 15B, in the second display apparatus 105E according to the embodiment of the present application, each group into which the plurality of first drive lines and the plurality of second drive lines are divided may comprise drive lines that are not adjacent (e.g., the group composed by $20_1$, $20_3$, $20_5$; $20_{n-4}$, $20_{n-2}$, $20_n$; $30_1$, $30_3$, $30_5$; and $30_{n-4}$, $30_{n-2}$, $30_n$ that are not adjacent). As can be seen from FIGS. 15A and 15B, adopting such grouped wiring manner, the grouping manner of the plurality of first drive lines and the plurality of second drive lines is not limited to grouping the adjacent drive lines, instead it is possible to select the drive lines that are not adjacent to group as needed by design and display requirements, thus avoiding selecting the narrow frame portion of the display device to perform wiring of the drive lines.

Figure 16:
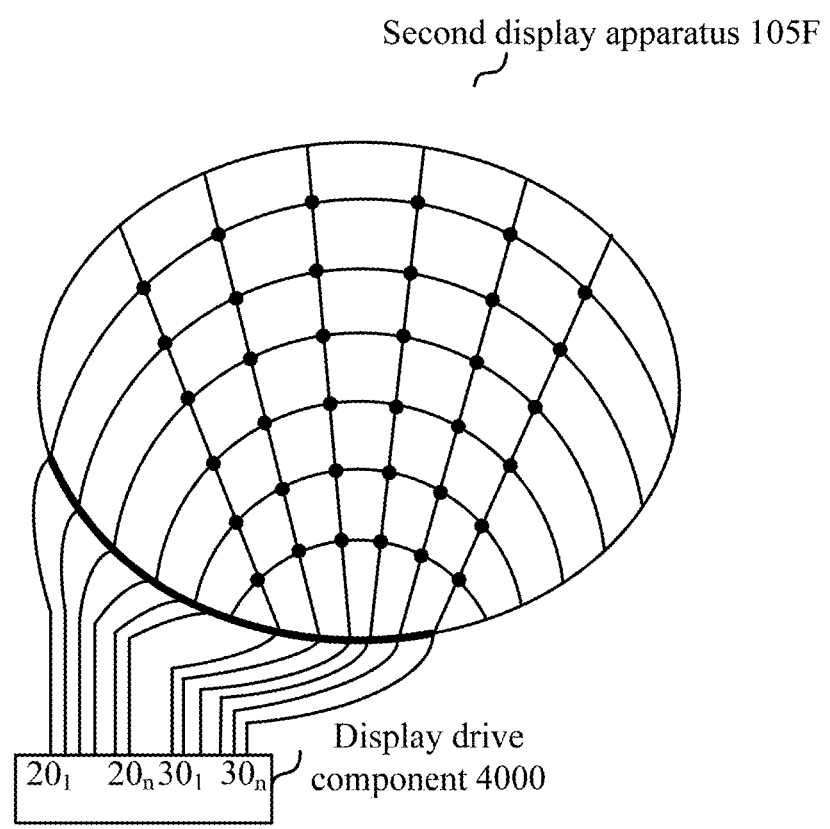
FIG. 16 is a schematic diagram illustrating a fourth example of the second display apparatus according to an embodiment of the present application.

FIG. 16 is a schematic diagram illustrating a fourth example of the second display unit according to an embodiment of the present application. In the second display apparatus 105F according to the embodiment of the present application, at least one type of the plurality of first type of drive lines and the plurality of second type of drive lines comprises at least one drive line that is a curve. As shown in FIG. 15, each ($20_1$ . . . $20_n$) of the plurality of first type of drive lines 2000 is a curve, and each ($30_1$ . . . $30_n$) of the plurality of second type of drive lines 3000 is a straight line. As can be readily appreciated, the number of the drive lines and the wiring manner as shown in FIG. 16 are merely illustrative, the second display unit according to an embodiment of the present application is not limited thereto. In another embodiment of the present application, it is allowed that the plurality of second type of drive lines ($30_1$ . . . $30_n$) are a curve, or alternatively, each or more drive lines among the plurality of first type of drive lines ($20_1$ . . . $20_n$) and the plurality of second type of drive lines ($30_1$ . . . $30_n$) are a curve.

As shown in FIG. 16, edge of a visible area of the second display apparatus 105F is divided into two portions, edge of the visible area to which the plurality of first type of drive lines and the plurality of second type of drive lines connected with the display drive component 4000 correspond is located in a first portion of the two portions, that is, the edge portion shown with a bolded line in FIG. 16, whereas edge of the visible area where the plurality of first type of drive lines and the plurality of second type of drive lines connected with the display drive component 4000 are not arranged is the second portion. In the embodiment shown in FIG. 16, the first portion and the second portion have two intersection points, that is, the first portion and the second portion are two separate continuous edge areas, respectively, only intersect at their respective endpoints. As can be readily appreciated, coverage of the present application is not limited thereto, the first portion and the second portion may be divided into a plurality of sub-portions, respectively, the plurality of sub-portions of the first portion and the second portion may be alternately distributed as shown below with reference to FIGS. 13A to 15B. Since the plurality of first type of drive lines ($20_1$ . . . $20_n$) are a curve, so that edge of the first portion may tend to cluster. That is, an edge length of the visible area corresponding to the first portion is less than 50% of a total edge length of the visible area. For example, in the example shown in FIG. 16, an edge length of the visible area corresponding to the first portion where drive lines are provided is ⅓ of a total edge length of the visible area. Thus, the second display apparatus 105F can be provided with a larger edge area that needs no drive line wiring, which thereby facilitates further narrowing the frame of the second display apparatus 105F. That is, in an electronic device where the second display apparatus 105F according to an embodiment of the present application is configured, the second display apparatus 105F may adapt to the shape of the electronic device as needed. Specifically, by adopting the configuration that at least one type of the plurality of first type of drive lines and the plurality of second type of drive lines comprises at least one drive line that is a curve, it is possible to bent the drive lines towards the edge of the second display unit that adapts to wiring based on the shape of the electronic device, and select not to configure wiring at the edge having no wiring space of the second display unit based on the shape of the electronic device. Herein, the edge having no wiring space of the second display unit may be an edge where the edge of the second display unit substantially overlaps with the outer frame of the electronic device per se. Alternatively, the edge having no wiring space of the second display unit may be an edge of the electronic device where the outer frame thereof is of an irregular shape and thus is inconvenient for wiring.

In addition, as shown in FIG. 16, curve shape of the drive lines conforms to shape of the edge of the second display unit. In the second display apparatus 105F as shown in FIG. 16, shape of the edge of the second display apparatus 105F is an ellipse. As can be readily appreciated, depending on application requirements, the shape of the edge of the second display unit according to an embodiment of the present disclosure is not limited to ellipse, instead it may be a variety of regular shapes like circle or irregular shapes. The shape of the drive lines being a curve can implement better conforming to the edge of the second display unit, which is a variety of regular or irregular shapes.

Specifically, the plurality of first type of drive lines ($20_1$ . . . $20_n$) which are curves have the same curvature as the corresponding edge of the second display apparatus 105F. In particular, in the example shown in FIG. 16, the plurality of first type of drive lines ($20_1$ . . . $20_n$) and part of the edge of the second display apparatus 105F form a curve group having the same circle center and radial outward to the outer center layer by layer, wherein part of the edge of the second display apparatus 105F is the outermost edge of the concentric nested curve group. Then the plurality of second type of drive lines ($30_1$ . . . $30_n$) may approximately be a plurality of straight lines radiated radially outward from the circle center. Extension lines of the plurality of second type of drive lines ($30_1$ . . . $30_n$) will intersect at the circle center. Further, the plurality of second type of drive lines ($30_1$ . . . $30_n$) may be divided into two groups symmetrical with respect to a center cross-section of the second display apparatus 105F, for example, drive lines $30_1$, $30_2$, $30_3$, and drive lines $30_{n-2}$, $30_{n-1}$, $30_n$.

In addition, as shown in FIG. 16, the plurality of first type of drive lines ($20_1 \ldots 20_n$) are projected as a plurality of curves arranged equidistantly on a plane vertical to a display direction of the array of display cells. In an embodiment of the present application, a surface where the array of display cells resides probably has fluctuation according to the shape of the electronic device to which it is applied. For example, when the second display unit is applied to a dial of a smart watch which is a convex surface, the surface where the array of display cells resides may be a convex surface corresponding to the dial. The direction of the convex outwardly facing the user is the display direction of the array of display cells, the plurality of first type of drive lines ($20_1 \ldots 20_n$) are projected as a plurality of curves arranged equidistantly on a plane vertical to the display direction.

Figure 17:
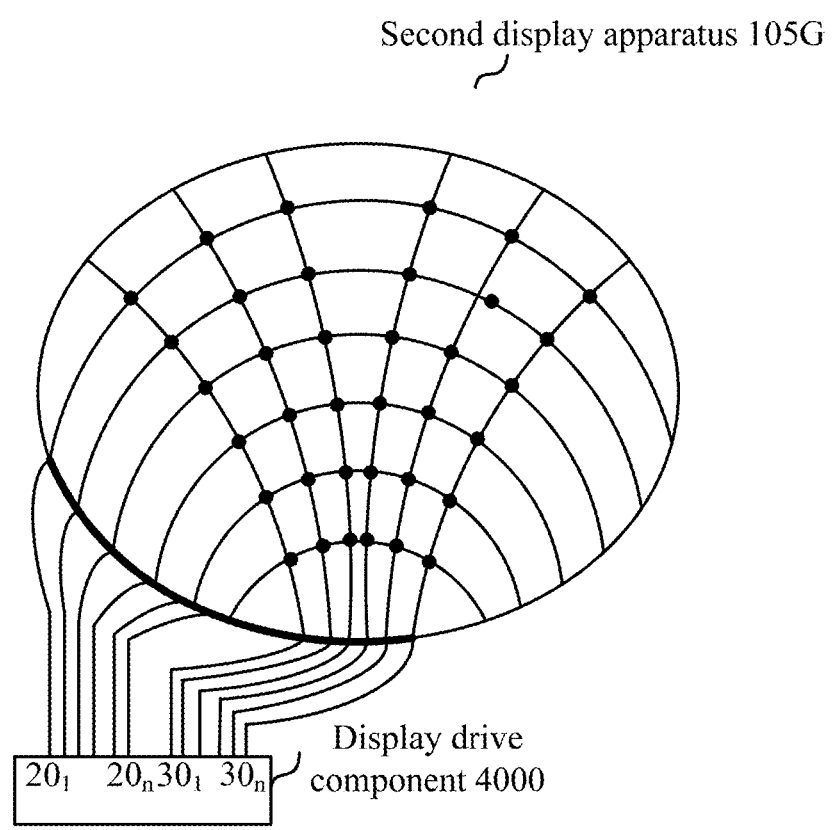
FIG. 17 is a schematic diagram illustrating a fifth example of the second display apparatus according to an embodiment of the present application.

FIG. 17 is a schematic diagram illustrating a fifth example of the second display unit according to an embodiment of the present application. In the second display apparatus 105G according to a second embodiment of the present application, each ($20_1 \ldots 20_n$) of the plurality of first type of drive lines 2000 and each of ($30_1 \ldots 30_n$) the plurality of second type of drive lines 30 is a curve. Specifically, similar to what is shown in FIG. 16, the plurality of first type of drive lines ($20_1 \ldots 20_n$) and part of the edge of the second display apparatus 105G form a curve group having the same circle center and radial outward to the outer center layer by layer, wherein part of the edge of the second display apparatus 105G is the outermost edge of the concentric nested curve group. The plurality of second type of drive lines ($30_1 \ldots 30_n$) are approximately divided into two groups symmetrical with respect to a center cross-section of the second display apparatus 105G, for example, drive lines $30_1, 30_2, 30_3$, and drive lines $30_{n-2}, 30_{n-1}, 30_n$, wherein each group of drive lines ($30_1, 30_2, 30_3$) or ($30_{n-2}, 30_{n-1}, 30_n$) are a portion of a group of inscribed circles that are nested mutually and have a common tangent point.

Accordingly, as compared with the second display apparatus 105F according to the embodiment of the present application as shown in FIG. 16, by configuring all the plurality of first type of drive lines 2000 and the plurality of second type of drive lines 3000 as curves, it is possible to further reduce an edge length of the visible area corresponding to the first portion where the drive lines are provided. For example, in the example shown in FIG. 16, an edge length of the visible area corresponding to the first portion where the drive lines are provided is ¼ of a total edge length of the visible area.

Figure 18:
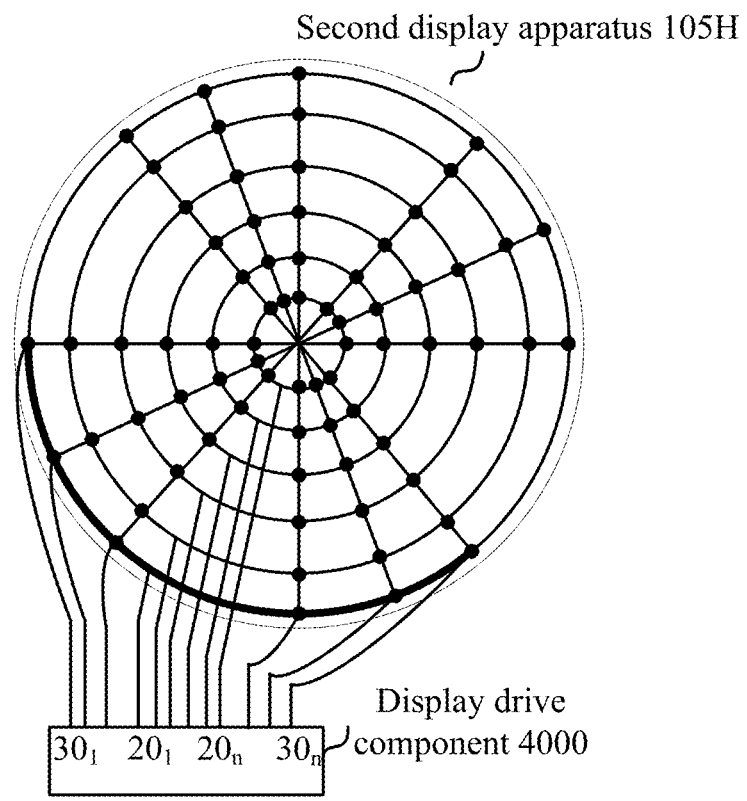
FIG. 18 is a schematic diagram illustrating a sixth example of the second display apparatus according to an embodiment of the present application.

FIG. 18 is a schematic diagram illustrating a sixth example of the second display unit according to an embodiment of the present application. In the second display apparatus 105H according to the embodiment of the present application, each ($20_1 \ldots 20_n$) of the plurality of first type of drive lines 2000 forms a circle, and each of ($30_1 \ldots 30_n$) the plurality of second type of drive lines 3000 is a straight line. Specifically, in the example shown in FIG. 18, the plurality of first type of drive lines ($20_1 \ldots 20_n$) are a group of concentric circles nested concentrically with the edge of the second display apparatus 105H, wherein the edge of the second display apparatus 105H is the outermost edge of the group of concentric circles. Then the plurality of second type of drive lines ($30_1 \ldots 30_n$) may approximately be a plurality of straight lines radiated outward from the common circle center of the concentric circles, the plurality of straight lines are the plurality of straight lines of the outermost circle. Accordingly, as compared with the second display apparatus 105F as shown in FIG. 16 and the second display apparatus 105G as shown in FIG. 17, by configuring all the plurality of first type of drive lines 2000 as circle, it is possible to make the wiring of the drive lines perfectly adapt to the circular outer frame of the display device.

Figure 19:
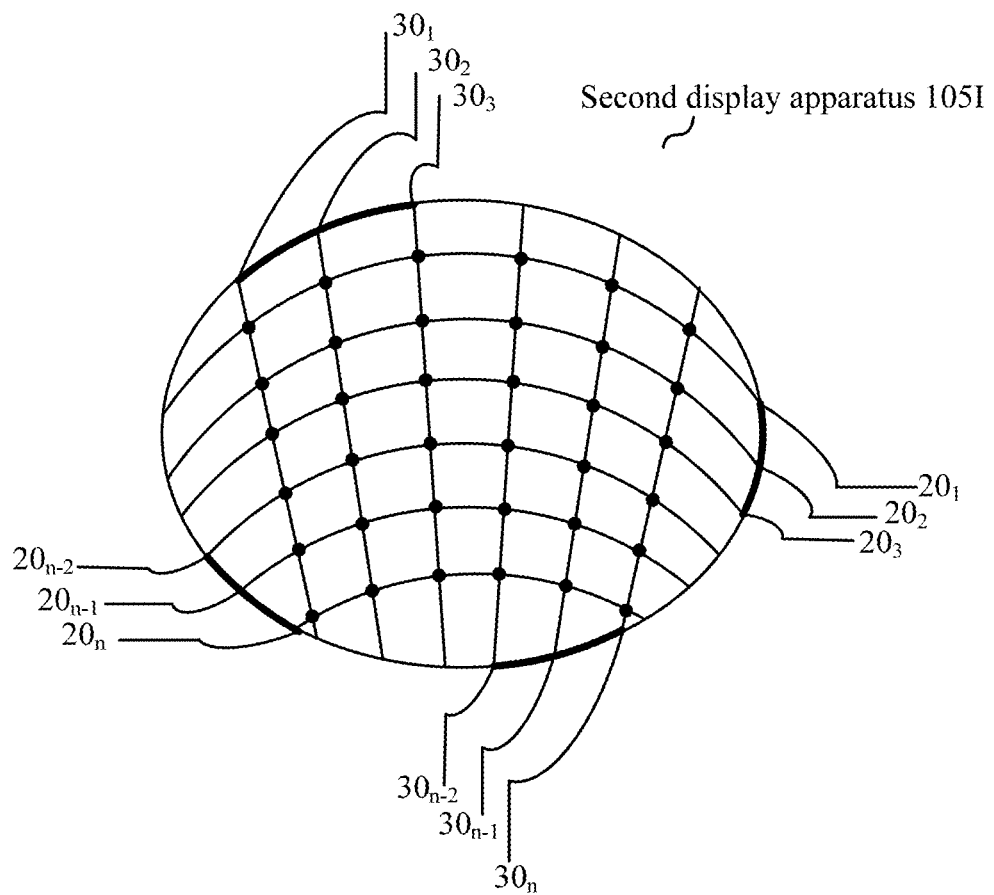
FIG. 19 is a schematic diagram illustrating a seventh example of the second display apparatus according to an embodiment of the present application.

FIG. 19 is a schematic diagram illustrating a seventh example of the second display unit according to an embodiment of the present application. In the second display apparatus 105I according to the embodiment of the present application, at least one drive line in at least one group among a plurality of groups of drive lines into which the plurality of first drive lines and the plurality of second drive lines are divided is a curve. Specifically, as shown in FIG. 19, the drive lines $20_1, 20_2, 20_3, 20_{n-2}, 20_{n-1}, 20_n$ are curves. In addition, the plurality of first drive lines and the plurality of second drive lines are divided into a plurality of groups of drive lines (four groups as shown in FIG. 19). As can be seen from FIG. 19, adopting such manner of combination of curve configuration and grouping configuration of the drive lines can make the wiring region of the edge of the display device more tend to cluster, facilitate further narrowing the frame of the display device, and meanwhile make the wiring of the drive lines more flexibly adapt to the outer frame of the display device, as compared with the cases of simply adopting the curve configuration (as shown in FIGS. 16 to 19) and those of simply adopting the grouping configuration (as shown in FIGS. 13 to 15B).

Figure 20A:
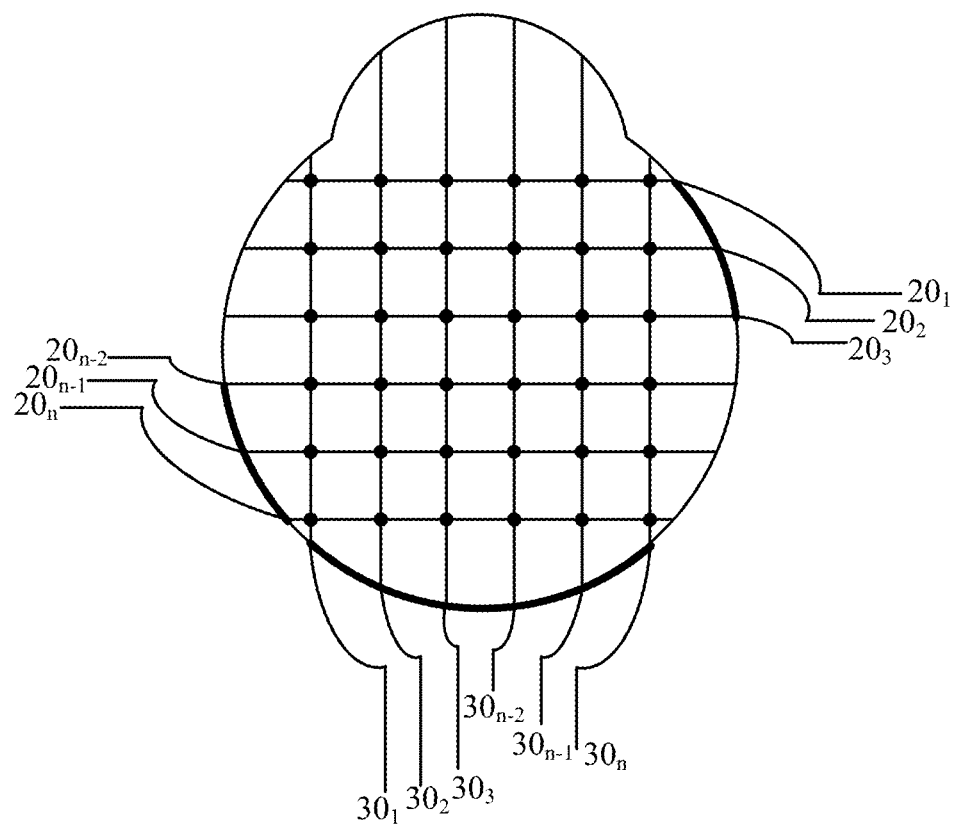
FIGS. 20A and 20B are schematic diagrams illustrating an eighth example of the second display apparatus according to an embodiment of the present application.
Figure 20B:
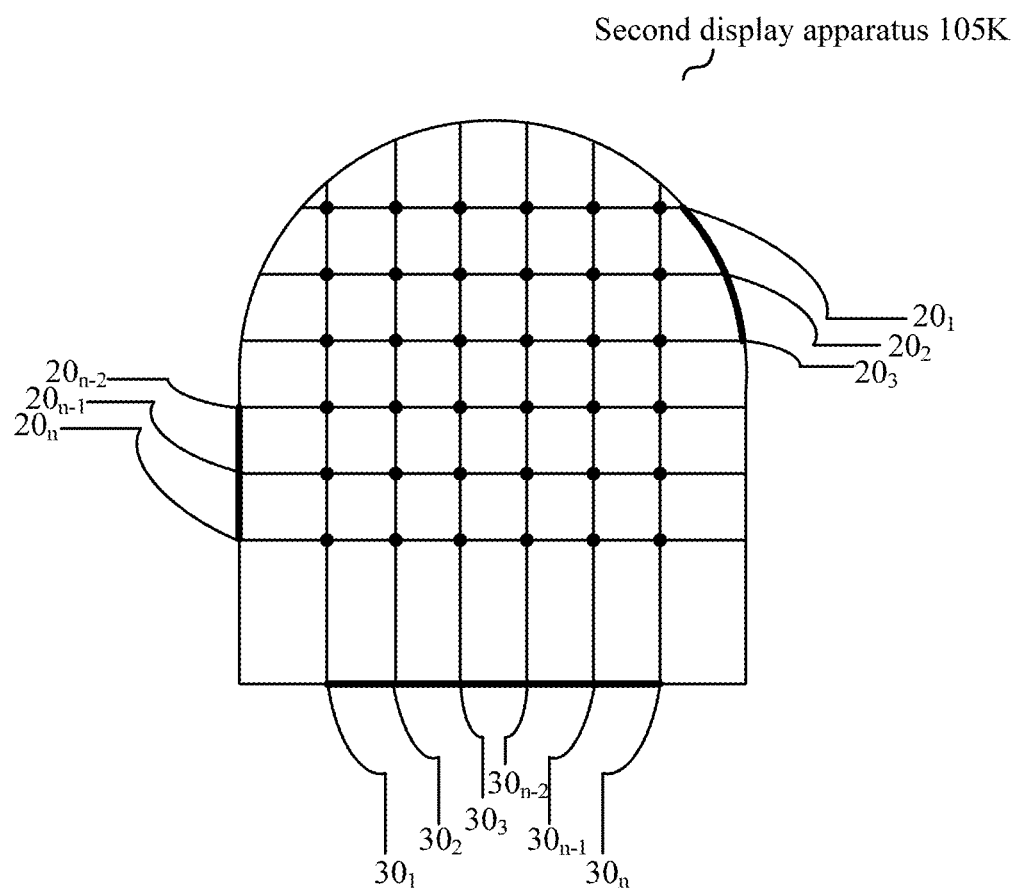

FIGS. 20A to 20B are schematic diagrams illustrating an eighth example of the second display unit according to an embodiment of the present application. In the second display units 105J and 105K according to the eighth embodiment of the present application, at least part of the edge of the surface where the array of display cells 40 residues is a curve, and the edge is at least divided into a first edge portion and a second edge portion, the first edge portion and the second edge portion have different curvatures. Specifically, as shown in FIG. 20A, the edge is divided into an upper first curve edge portion and a lower second curve edge portion, the two portions have different curvatures. Likewise, as shown in FIG. 20B, the edge is divided into an upper first curve edge portion and a lower second straight line edge portion, the two portions obviously have different curvatures. As can be seen from FIGS. 20A and 20B, adopting such wiring manner, the wiring of the plurality of drive lines is not provided in the first edge portion that needs to implement containing the narrow frame of the second display unit correspondingly, the corresponding drive lines, $30_1, 30_2, 30_3, 30_{n-2}, 30_{n-1}, 30_n$ are provided in group in the second edge portion that does not need to implement the narrow frame, so that the wiring can easily adapt to the frame shape according to different requirements. More specifically, for example, when the second display unit as shown in FIGS. 20A and 20B is applied to an electronic device like a smart watch, an edge where the dial of the smart watch is connected with the strap is the second edge portion that does not need to implement the narrow frame, the edge where the dial of the smart watch is not connected with the strap is the first edge portion. In the example shown in FIGS. 20A and 20B, one of the upper edge portion and the lower edge portion is selected as the portion to arrange the wiring group. As can be readily appreciated, the present application is not limited thereto, it is possible to select one of the left edge portion and the right edge portion as the portion to arrange the wiring group.

In the above, an electronic device and the display method according to the embodiments of the present application are described with reference to FIGS. 1 to 20B. The electronic device and the display method according to the embodiments of the present application can improve an overall energy utilization of the display component, an meanwhile can facilitate satisfying the requirement of miniaturizing the display component.

It should be noted that, in the specification, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identity elements in the procedure, method, product or equipment of the elements.

Finally, it should be noted that, the above-described series of processings do not only comprise processings executed chronologically in the order mentioned here, and also comprise processings executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and include several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limiting the present disclosure.

The invention claimed is:

1. A display component, comprising:
a light source unit configured to emit source light;
a polarization unit configured to at least partially convert the source light into a first polarized light with a first polarization direction;
a first reflecting unit configured to at least partially convert the first polarized light into a first reflected light on a first reflective surface; and
a display unit configured to receive the first reflected light and adjust the first reflected light to become initial light by adding information of an image to be displayed into the first reflected light,
wherein the first reflective surface is a first beam splitting surface for converting the first polarized light into the first reflected light and a first transmitted light, and the display component further comprises a second reflecting unit configured to at least partially convert the first transmitted light into a second reflected light with the first polarization direction on a second reflective surface, wherein the direction of the second reflected light matches with the direction of the first reflected light, and the display unit is within an irradiation area of the second reflected light.

2. The display component as claimed in claim 1, wherein the polarization unit is provided within an irradiation area of the source light, and the first reflecting unit is provided within an irradiation area of the first polarized light.

3. The display component as claimed in claim 1, wherein a thickness of the first reflecting unit in an exit direction of the initial light is less than a width of the display unit in an incident direction of the source light.

4. The display component as claimed in claim 1, wherein the angle between the incident plane of the first reflected light on the first reflecting unit and the first reflective surface is less than a first threshold and the first threshold is 45°.

5. The display component as claimed in claim 1, wherein the first reflecting unit completely converts the first polarized light into the first reflected light on the first reflective surface.

6. The display component as claimed in claim 1, wherein the initial light is light reflected by the display unit, and the first reflecting unit is at least partially within an irradiation area of the initial light, and a transmittance in the direction of the initial light exceeds a second threshold and the second threshold is 50%, so that the initial light is capable of transmitting through the first reflecting unit.

7. The display component as claimed in claim 1, wherein:
the first reflected light irradiates a first area of the display unit, the second reflected light irradiates a second area of the display unit, and the first area and the second area do not overlap with each other; and
an intensity difference between the first reflected light and the second reflected light is less than a third threshold, so that a difference ratio between a maximum intensity and a minimum intensity in the initial light is less than a fourth threshold.

8. The display component as claimed in claim 7, wherein the first beam splitting surface is coated with at least one film layer that determines an intensity proportion of light reflected and transmitted by the first reflecting unit.

9. An electronic device, comprising:
a processing component configured to generate a first image to be displayed and execute display control;
a display component configured to execute display of the first image and comprising:
a light source unit configured to emit source light;
a polarization unit configured to at least partially convert the source light into a first polarized light with a first polarization direction;
a first reflecting unit configured to at least partially convert the first polarized light into a first reflected light on a first reflective surface; and
a display unit configured to receive the first reflected light and adjust the first reflected light to become initial light by adding information of an image to be displayed into the first reflected light,
wherein the first reflective surface is a first beam splitting surface for converting the first polarized light into the first reflected light and a first transmitted light, and the display component further comprises:
a second reflecting unit configured to at least partially convert the first transmitted light into a second reflected light with the first polarization direction on a second reflective surface, wherein the direction of the second reflected light matches with the direction of the first reflected light, and the display unit is within an irradiation area of the second reflected light.

10. The electronic device as claimed in claim 9, wherein the polarization unit is provided within an irradiation area of the source light, and the first reflecting unit is provided within an irradiation area of the first polarized light.

11. The electronic device as claimed in claim 9, further comprising:
- a first display apparatus in which the display component is provided and which comprises:
- a light path converting component configured to receive and perform light path conversion on the light corresponding to the first image and coming from the first display component to thereby form a virtual image corresponding to the first image, so that a viewer at a particular position perceives the virtual image corresponding to the first image, wherein a size of the virtual image perceived is greater than a display size of the display component.

12. The electronic device as claimed in claim 11, further comprising:
- a body apparatus;
- a fixing apparatus connected with the body apparatus and configured to fix a position relationship relative to a user of the electronic device,
- wherein the processing component is provided in the body apparatus, the first display component is provided in the body apparatus and/or the fixing apparatus.

13. The electronic device as claimed in claim 11, wherein the light path converting component comprises a collimating unit and a wave guide unit, the collimating unit is configured to collimate the initial light corresponding to the first image and coming from the display component into collimated light corresponding to the first image and guide the same into the wave guide unit, the waveguide unit is configured to guide the collimated light corresponding to the first image and coming from the collimating unit to the particular position.

14. The electronic device according to claim 12, wherein the fixing apparatus comprises at least a fixed state in which the fixing apparatus serves as at least a portion of an annular space or an approximate annular space that satisfies a first predetermined condition, the annular space or the approximate annular space surrounds periphery of a columnar body that satisfies a second predetermined condition.

15. The electronic device according to claim 14, further comprising a second display unit provided on the body apparatus and/or the fixing apparatus and configured to output a second image, wherein the first display unit and the second display unit are display units that follow different display principles.

16. The electronic device according to claim 14, the first display unit has a first visible area, light corresponding to the first image exits from the first visible area, the second display unit has a second visible area, light corresponding to the second image exits from the second visible area, and a shape of the first visible area and a shape of the second visible area are different.

* * * * *